US009985715B2

(12) United States Patent
Cho et al.

(10) Patent No.: US 9,985,715 B2
(45) Date of Patent: May 29, 2018

(54) RELAYING DEVICE AND OPERATING METHOD OF THE RELAYING DEVICE, AND OPERATING METHOD OF ELECTRONIC DEVICE

(71) Applicant: Samsung Electronics Co., Ltd., Gyeonggi-do (KR)

(72) Inventors: Ik-Hyun Cho, Gyeonggi-do (KR); Youn-Hyoung Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days. days.

(21) Appl. No.: 15/390,062

(22) Filed: Dec. 23, 2016

(65) Prior Publication Data

US 2017/0187447 A1 Jun. 29, 2017

(30) Foreign Application Priority Data

Dec. 23, 2015 (KR) .................. 10-2015-0185274

(51) Int. Cl.
| | |
|---|---|
| *H04B 3/36* | (2006.01) |
| *H04B 7/155* | (2006.01) |
| *H04W 8/00* | (2009.01) |
| *H04W 8/14* | (2009.01) |
| *H04W 76/02* | (2009.01) |
| *H04W 84/18* | (2009.01) |

(52) U.S. Cl.
CPC ........ *H04B 7/15507* (2013.01); *H04W 8/005* (2013.01); *H04W 8/14* (2013.01); *H04W 76/02* (2013.01); *H04W 84/18* (2013.01)

(58) Field of Classification Search
CPC .. H04B 7/15507; H04W 76/02; H04W 84/18; H04W 8/005; H04W 8/14

USPC ......... 455/41.1, 41.2, 435.1, 13.1, 11.1, 464, 455/552.1, 411, 556.1, 509; 370/315, 370/328, 329, 338; 709/223, 228, 227, 709/217
See application file for complete search history.

(56) References Cited

U.S. PATENT DOCUMENTS

| | | | |
|---|---|---|---|
| 8,577,392 B1 | 11/2013 | Pal et al. | |
| 2007/0207831 A1* | 9/2007 | Tinsley | G06F 13/4004 455/556.1 |
| 2008/0181172 A1 | 7/2008 | Angelhag et al. | |
| 2011/0238807 A1* | 9/2011 | Lee | H04W 8/24 709/223 |
| 2013/0111043 A1* | 5/2013 | McGuire | H04L 61/256 709/228 |
| 2013/0136131 A1* | 5/2013 | Hirai | H04L 45/74 370/392 |
| 2013/0252546 A1* | 9/2013 | Yoneyama | H04B 5/00 455/41.1 |

(Continued)

*Primary Examiner* — Tan H Trinh
(74) *Attorney, Agent, or Firm* — The Farrell Law Firm, P.C.

(57) ABSTRACT

A method of a relaying device for controlling electronic devices is provided. The method includes registering a first electronic device in the relaying device, receiving, from the first electronic device, first event information relating to a first event at the first electronic device, discovering a second electronic device, among at least one electronic device registered in the relaying device in advance, to perform the first event, controlling the first electronic device and the second electronic device to connect to each other, and controlling the second electronic device to perform the first event.

17 Claims, 20 Drawing Sheets

(56) References Cited

U.S. PATENT DOCUMENTS

| | | | | |
|---|---|---|---|---|
| 2013/0304860 A1* | 11/2013 | Yang | H04L 67/34 | 709/217 |
| 2014/0010172 A1* | 1/2014 | Wei | H04W 76/023 | 370/329 |
| 2014/0057670 A1* | 2/2014 | Lim | H04W 8/005 | 455/509 |
| 2014/0199972 A1* | 7/2014 | Ejima | H04W 4/008 | 455/411 |
| 2014/0219261 A1* | 8/2014 | Johnsson | H04W 76/023 | 370/338 |
| 2014/0227976 A1* | 8/2014 | Callaghan | G06F 8/65 | 455/41.2 |
| 2014/0235166 A1* | 8/2014 | Molettiere | H04B 7/26 | 455/41.2 |
| 2015/0109897 A1* | 4/2015 | Lee | H04W 48/10 | 370/216 |
| 2015/0134743 A1* | 5/2015 | Heo | H04W 4/206 | 709/204 |
| 2015/0222520 A1* | 8/2015 | Thrybom | H04L 43/0852 | 370/252 |
| 2015/0237515 A1* | 8/2015 | Park | H04W 24/08 | 455/405 |
| 2015/0327046 A1* | 11/2015 | Lee | H04W 56/002 | 370/338 |
| 2015/0382436 A1* | 12/2015 | Kelly | G08C 17/02 | 315/131 |
| 2016/0044552 A1* | 2/2016 | Heo | H04W 4/008 | 370/331 |
| 2016/0081125 A1* | 3/2016 | Heatley | H04W 72/0406 | 370/329 |
| 2016/0119738 A1* | 4/2016 | Hampel | H04W 8/005 | 370/329 |
| 2016/0119745 A1* | 4/2016 | Choi | H04W 4/008 | 455/41.3 |
| 2016/0127559 A1* | 5/2016 | Baek | G06F 21/35 | 455/417 |
| 2016/0142987 A1* | 5/2016 | Blankenship | H04W 4/005 | 370/350 |
| 2016/0179070 A1* | 6/2016 | Hwang | G05B 15/02 | 700/83 |
| 2016/0205653 A1* | 7/2016 | Kim | H04B 17/318 | 455/456.5 |
| 2017/0027009 A1* | 1/2017 | Dumpala | H04W 76/023 | |
| 2017/0105111 A1* | 4/2017 | Li | H04W 72/04 | |
| 2017/0134926 A1* | 5/2017 | Johnsson | H04W 8/005 | |

* cited by examiner

RELAYING DEVICE AND OPERATING METHOD OF THE RELAYING DEVICE, AND OPERATING METHOD OF ELECTRONIC DEVICE

PRIORITY

This application claims priority under 35 U.S.C. § 119(a) to a Korean Patent Application filed in the Korean Intellectual Property Office on Dec. 23, 2015, and assigned Serial No. 10-2015-0185274, the entire disclosure of which is incorporated herein by reference.

BACKGROUND

1. Field of the Disclosure

The present disclosure relates generally to a relaying device and operating method of the relaying device, and more particularly, to a relaying device and operating method of the relaying device that controls electronic devices connected with various kinds of connectivity technologies and relays events that occur among the electronic devices.

2. Description of the Related Art

Recently, the development of the Internet of things (IoT) has proceeded rapidly. In addition to the development of the IoT, various kinds of connectivity technologies for inter-IoT communication are being developed. Electronic devices to support the various connectivity technologies under the IoT environment are also being developed rapidly. With the various kinds of connectivity technologies, an electronic device may transmit/receive an event or data to/from another electronic device.

Conventional event transmission or data communication between electronic devices is implemented in a point-to-point manner, and events and data can be exchanged only between devices which are directly connected. In this regard, if an electronic device connected to a first electronic device needs to make a new connection with a second electronic device, it has to first release the connection with the first electronic device.

A conventional electronic device may be directly connected to a relaying device while making a Bluetooth (BT) audio streaming (call/music) connection. If the relaying device needs to make a connection with another electronic device or transmit data to the other electronic device, it is required to release the existing connection.

Accordingly, a need exists for a technology to enable a plurality of electronic devices to be simultaneously connected to one another and exchange events and data with one another.

SUMMARY

The present disclosure has been made to address at least the problems and disadvantages described above, and to provide at least the advantages described below.

Accordingly, an aspect of the present disclosure is to provide a relaying device and operating method of the relaying device, which controls connections among electronic devices having various kinds of connectivity technologies and relays events that occur among the electronic devices.

Accordingly, an aspect of the present disclosure is to provide a method of controlling connections among electronic devices having various kinds of connectivity technologies and relaying events that occur among the electronic devices.

In accordance with an aspect of the present disclosure, a method of a relaying device is provided. The method includes registering a first electronic device in the relaying device, receiving, from the first electronic device, first event information relating to a first event at the first electronic device, discovering a second electronic device, among at least one electronic device registered in the relaying device in advance, to perform the first event, controlling the first electronic device and the second electronic device to connect to each other, and controlling the second electronic device to perform the first event.

In accordance with another aspect of the present disclosure, a relaying device is provided. The relaying device includes a first communication module connected to a first electronic device for receiving, from the first electronic device, first event information relating to a first event at the first electronic device, a second communication module connected to a second electronic device for sending the first event information to the second electronic device, a memory for storing first registration information and second registration information for the first electronic device and the second electronic device, respectively, and a processor for controlling the first communication module and the second communication module to connect the first electronic device and the second electronic device to each other, and controlling the second communication module for the first event to be performed in the second electronic device.

In accordance with another aspect of the present disclosure, a method of an electronic device is provided. The method of the electronic device includes registering the electronic device in a relaying device, sending, by the electronic device, an event notification signal to the relaying device, and when the relaying device discovers a first wireless electronic device, among at least one wireless electronic device registered in the relaying device in advance, to perform a function related to an event at the electronic device, sending event information relating to the event to at least one of the relaying device and the first wireless electronic device under the control of the relaying device.

BRIEF DESCRIPTION OF THE DRAWINGS

The above and other aspects, features, and advantages of embodiments of the present disclosure will be more apparent from the following description taken in conjunction with the accompanying drawings, in which.

DETAILED DESCRIPTION OF EMBODIMENTS OF THE PRESENT DISCLOSURE

Figure 1:
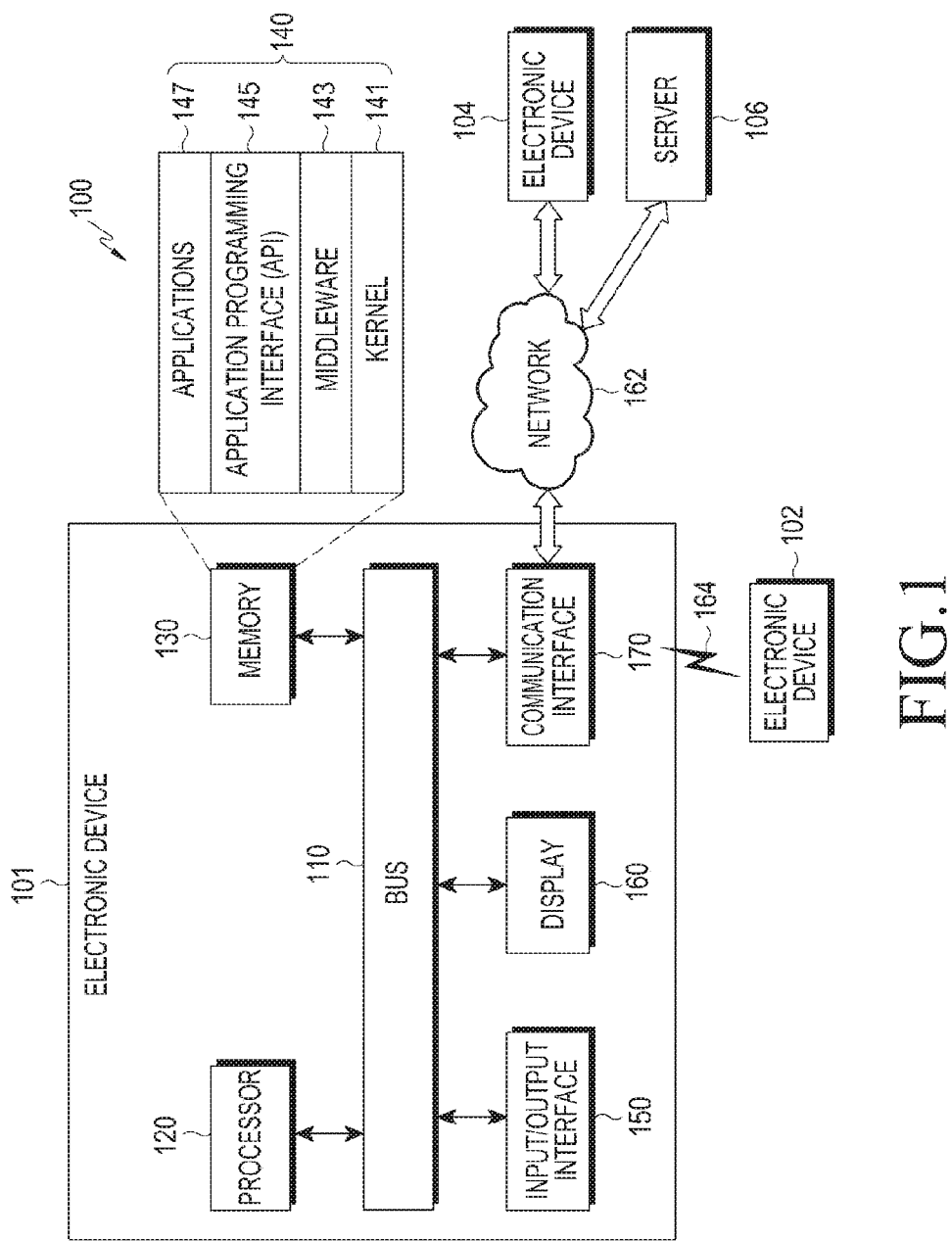
FIG. 1 is a block diagram of a network including an electronic device, according to an embodiment of the present invention.

The following description provides various embodiments of the present disclosure with reference to the accompanying drawings, in which like reference numerals refer to like elements. This disclosure should not be construed as limited to the embodiments set forth herein, and may be understood as including their modifications, equivalents, and/or alternatives.

The terms "have", "having", "comprise", and "comprising" as used herein specify the presence of disclosed functions, operations, or components, but do not preclude the presence or addition of one or more other functions, operations, or components.

As used herein, the terms "A or B", "at least one of A and/or B", and "one or more of A and/or B" includes any and all combinations of one or more of the associated listed items. For example, "A or B", "at least one of A and B", and "at least one of A or B" may indicate (1) A, (2) B, or (3) A and B.

Terms such as "first", "second", etc., may be used to indicate various components, but the components should not be restricted by the terms. These terms are only used to distinguish one element, component, region, layer or section from another element, component, region, layer or section. For example, a first user equipment (UE) and a second UE may refer to different UEs irrespective of their order or importance. For example, the first component may be referred to as the second component, and vice versa, within the scope of the present disclosure.

When \a component (e.g., a first component) is described as operatively or communicatively "coupled" with/to or "connected" to another component (e.g., a second component), it is to be understood that the first component may be directly connected or coupled to the second component or may be indirectly connected or coupled to the second component via another component (e.g., a third component). However, if a component (e.g., a first component) is said to be "directly connected" or "directly coupled" to another component (e.g., a second component), it should be interpreted that there is no component (e.g., a third component) between the first and second components.

The expression "configured to" as user herein may be used interchangeably with the terms "suitable for", "having the capacity to", "designed to", "adapted to", "made to", or "capable of" depending on the given situation. The expression "configured to" may not necessarily mean "specifically designed to" in terms of hardware. Rather, it may mean to "able to cooperate with" under a certain situation. For example, "a processor configured to perform A, B and C functions" may refer to a dedicated processor, e.g., an embedded processor for performing A, B and C functions, or a general purpose processor, e.g., a central processing unit (CPU) or an application processor that may perform A, B and C functions by executing one or more software programs stored in a memory.

The terms used herein are merely used for the purpose of explaining embodiments of the present disclosure and are not intended to limit the present disclosure to the embodiments. As used herein, the singular forms "a", "an" and "the" are intended to include the plural forms as well, unless the context clearly indicates otherwise. All terms, including technical and scientific terms, used herein have the same meaning as commonly understood by one of ordinary skill in the art to which this disclosure belongs. It will be further understood that terms, such as those defined in commonly used dictionaries, should be interpreted as having a meanings that are consistent with their meaning in the context of the relevant art and should not be interpreted in an idealized or overly formal sense unless expressly so defined herein. The terminology used herein is for the purpose of describing particular embodiments only and is not intended to be limiting of the embodiments of the present disclosure.

An electronic device according to various embodiments of the present disclosure may include at least one of smart phones, tablet personal computers (PCs), mobile phones, video phones, e-book readers, desktop PCs, laptop PCs, netbook computers, workstations, servers, personal digital assistants (PDAs), portable multimedia players (PMPs), MP3 players, mobile medical devices, cameras, and wearable devices. In various embodiments, the wearable devices may include at least one of accessory typed devices (e.g., watches, rings, bracelets, anklets, necklaces, glasses, contact lenses, or head-mounted devices (HMDs)), cloth or clothing type devices (e.g., electronic clothing), body-attachable devices (e.g., skin pads or tattoos), and implantable circuits.

In some embodiments, the electronic device may be a home appliance. The home appliance may include at least one of televisions, digital versatile disc (DVD) players, audio systems, refrigerators, air conditioners, cleaning machines, ovens, microwaves, washing machines, air purifiers, set-top boxes, home automation control panels, security control panels, TV sets (e.g., Samsung HomeSync™, Apple TV™, or Google TV™), game consoles (e.g., Xbox™, PlayStation™), electronic dictionaries, electronic keys, camcorders, and electronic albums.

In some other embodiments, the electronic device may include at least one of a variety of medical equipment (e.g., various portable medical meters (e.g., blood sugar meters, heart rate meters, blood pressure meters, clinical thermometers, etc.), magnetic resonance angiography (MRA) devices, magnetic resonance imaging (MRI) devices, computer tomography (CT) devices, photographing devices, ultrasonic devices, etc.), navigation devices, global navigation satellite systems (GNSSs), event data recorders (EDRs), flight data recorders (FDRs), car infotainment devices, marine electronic devices (e.g., marine navigation systems, gyro-compass, etc.), avionics, security devices, car head units, industrial or home robots, banking agency's automatic teller machines (ATMs), point of sale (POS) devices, and devices for Internet of things (IoT) (e.g., bulbs, various sensors, electricity or gas meters, sprinklers, fire alarms, thermostats, street lamps, toasters, health machines, hot-water tanks, heaters, boilers, etc.).

In some embodiments, the electronic device may include at least one of furniture or part of a building/structure, electronic boards, electronic signature receiving devices, projectors, and various instrumental equipment (e.g., meters for water, electricity, gas, or radio waves).

The electronic device in accordance with various embodiments of the present disclosure may be one or a combination of the aforementioned various devices. The electronic device may be a flexible electronic device. The electronic device is not limited to what is described above, but may include a device that would emerge in the future with the advancement of technology.

An electronic device according to various embodiments of the present disclosure will be described with reference to accompanying drawings. The term "user" as herein used may refer to a person who uses the electronic device or a device (e.g., an artificial intelligence device) that uses the electronic device.

FIG. 1 is a block diagram of a network including an electronic device, according to an embodiment of the present invention Referring to FIG. 1 an electronic device 101 in a network environment 100 is provided. The electronic device 101 includes a bus 110, a processor 120, a memory 130, an input/output (I/O) interface 150, a display 160, and a communication interface 170. In some embodiments, the electronic device 101 may omit at least one of the components, or may additionally include some other component(s).

The bus 110 is a circuit to connect the components 110 to 170 to one another, and deliver communications (e.g., control commands and/or data) among the components 110 to 170.

The processor 120 includes one or more of CPUs, application processors (APs) or communication processors (CPs). The processor 120 performs operations or data processing related to control and/or communications of at least one of the other components of the electronic device 101.

The memory 130 includes volatile and/or non-volatile memories. The memory 130 stores a command or data involved in at least one of the other components of the electronic device 101. The memory 130 stores software and/or a program 140. The program 140 may include a kernel 141, a middleware 143, an application programming interface (API) 145, applications 147. At least a part of the kernel 141, middleware 143, or API 145 may be referred to as an operating system (OS).

The kernel 141 controls or manages system resources (e.g., the bus 110, the processor 120, the memory 130) to be used to carry out an operation or function implemented by the other programming modules, e.g., the middleware 143, the API 145, or the application programs 147. Furthermore, the kernel 141 provides an interface for the middleware 143, the API 145, or the application programs 147 to access respective components of the electronic device 101 to control or manage system resources.

The middleware 143 may act as intermediary for the API 145 or the applications 147 to communicate data with the kernel 141.

Furthermore, the middleware 143 handles one or more requests for tasks received from the application programs 147 in order of priority. For example, the middleware 143 may give priority to at least one of the applications 147 in using system resources (e.g., the bus 110, the processor 120, the memory 130) of the electronic device 101. The middleware 143 performs scheduling or load balancing on one or more requests for tasks by handling the one or more requests for tasks according to the priorities given to the at least one of them.

The API 145 is an interface for the applications 147 to control a function provided from the kernel 141 or the middleware 143, and may include at least one interface or function (e.g., an instruction) for e.g., file control, window control, image processing, text control, etc.

The I/O interface 150 serves as an interface to deliver commands or data input from the user or an external device, e.g., a first external device 102 or a second external electronic device 104, to other components of the electronic device 101. The I/O interface 150 also outputs commands or data received from the other components of the electronic device 101 to the user or the external devices.

The display 160 may include a liquid crystal display (LCD), a light emitting diode (LED) display, an organic LED (OLED) display, micro-electromechanical system (MEMS) display, or an electronic paper display. The display 160 displays various contents, e.g., text, images, video, icons, symbols, etc., for the user. The display 160 may include a touch screen, which detects touches, gestures, proximity or hovering inputs by way of an electronic pen or a body part of the user.

The communication interface 170 establishes communication between the electronic device 101 and the first external electronic device 102, the second external electronic device 104 or a server 106.

For example, the communication interface 170 may be connected to a network 162 through wired or wireless communication and may communicate with the second external electronic device 104 or the server 106.

The wireless communication corresponds to a cellular communication protocol, using at least one of e.g., long-term evolution (LTE), LTE-advanced (LTE-A), code divisional multiplexing access (CDMA), wideband CDMA (WCDMA), universal mobile telecommunications system (UMTS), wireless broadband (WiBro), global system for mobile communications (GSM), etc. The wireless communication may also include short-range communication 164. The short-range communication 164 includes at least one of e.g., Wi-Fi, Bluetooth, near field communication (NFC), GNSS, etc. The GNSS may include at least one of global positioning system (GPS), global navigation satellite system (Glonass), beidou navigation satellite system (Beidou), or Galileo, the European global satellite-based navigation system). In the following description, "GPS" may be interchangeably used with "GNSS". The wired communication includes at least one of e.g., universal serial bus (USB), high definition multimedia interface (HDMI), recommended standard (RS) 232, plain old telephone service (POTS), and the like.

The network 162 includes a telecommunication network, e.g., at least one of computer networks (e.g., local area network (LAN) or wide area networks (WAN)), Internet, and telephone network.

Each of the first and second external electronic devices 102 and 104 may or may not be of the same type as that of the electronic device 101. The server 106 may include a group of one or more of servers. All or a part of operations executed in the electronic device 101 may also be executed in one or more of other electronic devices 102 and 104, or in the server 106. When the electronic device 101 needs to perform a function or service automatically or on request, the electronic device 101 may request the external electronic device 102 or 104, or the server 106 to perform at least a part of the function or service, instead of or in addition to performing the function or the service by itself. In this case, the external electronic device 102, 104 or the server 106 performs the requested function or service or the additional function, and sends the results to the electronic device 101. The electronic device 101 provides the function or the service by processing the received results intact or additionally. For this cloud computing, distributed computing, or client-server computing may be used.

Figure 2:
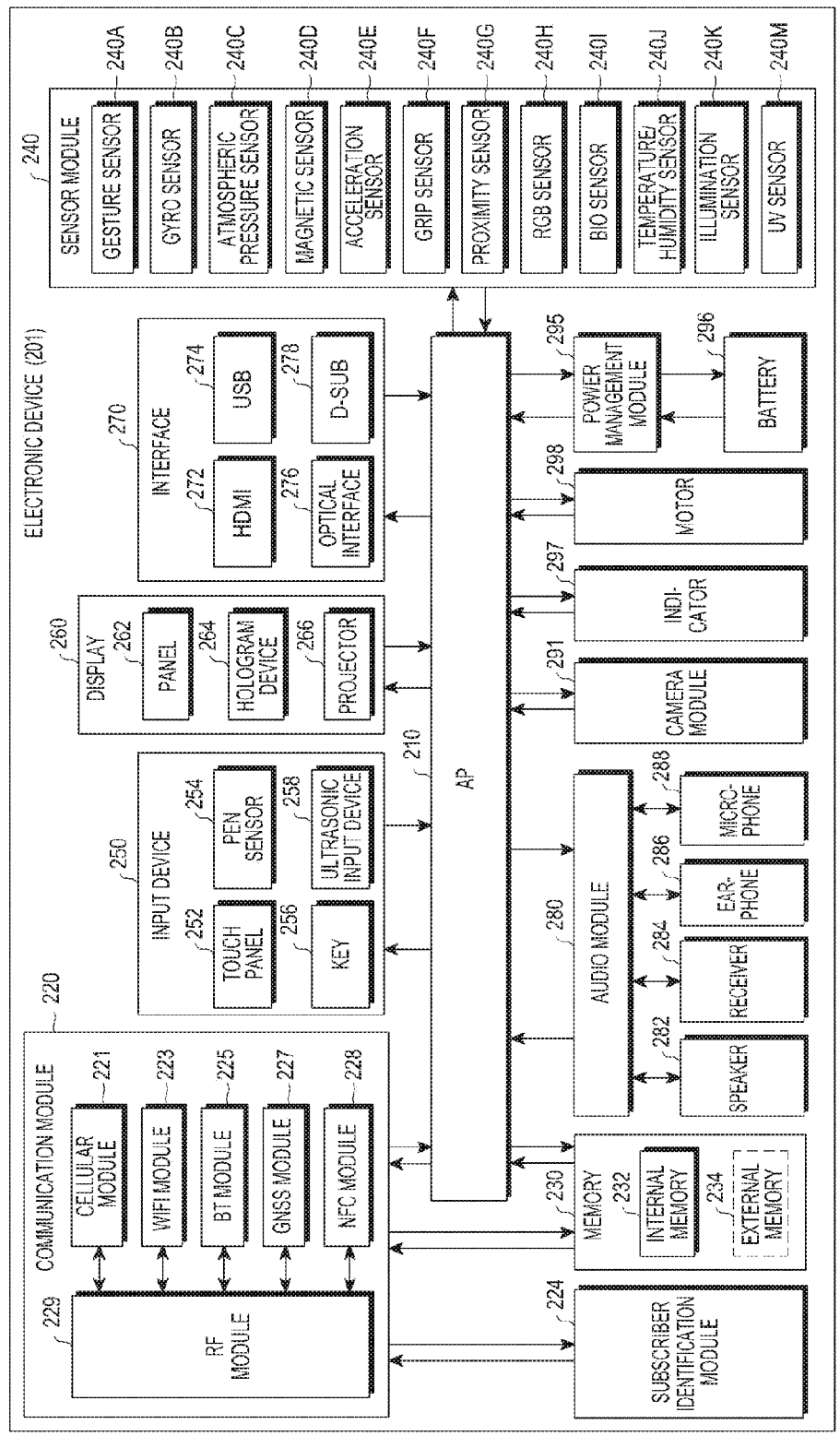
FIG. 2 is a block diagram of a configuration of an electronic device, according to an embodiment of the present disclosure.

FIG. 2 is a block diagram of a configuration of an electronic device, according to an embodiment of the present disclosure.

Referring to FIG. 2 a configuration of an electronic device 201 is provided. An electronic device 201 may include a part or all of the electronic device 101 shown in FIG. 1. The electronic device 201 includes one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 controls hardware and software components connected to the processor 210 by running an operating system or application programs, and performs data processing and operation. The processor 210 may be implemented in e.g., a system on chip (SoC). The processor 210 may further include a graphic processing unit (GPU) and/or an image signal processor. The processor 210 may also include at least a part of the components shown in FIG. 2, e.g., a cellular module 221. The processor 210 processes a command or data received from at least one of the other components of the electronic device 201, e.g., a nonvolatile memory to be loaded onto a volatile memory, and stores various types of data in the nonvolatile memory.

The communication module 220 may be configured in the same or a similar way to the communication interface 170 of FIG. 1. The communication module 220 may include the cellular module 221, a Wi-Fi module 223, a Bluetooth module 225, a GNSS module 227 (e.g., GPS module, Glonass module, Beidou module, or Galileo module), a NFC module 228, and a radio frequency (RF) module 229.

The cellular module 221 provides voice call, video call, texting, and/or Internet services over a communication network. The cellular module 221 may also identify and authenticate the electronic device 201 in the communication network in cooperation with the SIM 224. The cellular module 221 may perform at least a part of functions that the AP 210 provides. The cellular module 221 includes a CP.

The Wi-Fi module 223, the Bluetooth module 225, the GNSS module 227, and the NFC module 228 may each include a processor for processing data sent or received through the corresponding module. At least some of the cellular module 221, the Wi-Fi module 223, the Bluetooth module 225, the GNSS module 227, and the NFC module 228 may be integrated in a single integrated circuit or an IC package.

The RF module 229 transmits and/or receives communication signals, e.g., RF signals. The RF module 229 may include a transceiver, a power amp module (PAM), a frequency filter, a low noise amplifier (LNA), or an antenna. At least one of the cellular module 221, the Wi-Fi module 223, the Bluetooth module 225, the GNSS module 227, and the NFC module 228 may transmit and/or receive RF signals through a separate RF module.

The SIM 224 includes a card including a subscriber identification module and/or an embedded SIM, and includes unique identification information, e.g., an integrated circuit card identifier (ICCID) or an international mobile subscriber identity (IMSI).

The memory 230 (corresponding to the memory 130 of FIG. 1) may include an internal memory 232 or an external memory 234.

The internal memory 232 may include at least one of a volatile memory, such as dynamic random access memory (DRAM), static RAM (SRAM), synchronous dynamic RAM (SDRAM), etc.; a non-volatile memory, such as one time programmable read only memory (OTPROM), programmable ROM (PROM), erasable and programmable ROM (EPROM), electrically erasable and programmable ROM (EEPROM), mask ROM, flash ROM, NAND flash memory, Nor flash memory, etc.; a hard driver; and a solid state driver (SSD).

The external memory 234 may further include a flash drive, such as compact flash (CF), secure digital (SD), micro secure digital (Micro-SD), mini secure digital (Mini-SD), extreme digital (xD), multimedia card (MMC), memory stick, etc. The external memory 234 may be operationally and/or physically connected to the electronic device 201 through various interfaces.

The sensor module 240 measures or detects a physical quantity by monitoring the electronic device 201 and converts the measured or detected information into an electric signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green, Blue (RGB) sensor 240H, a bio sensor 240I, a temperature/humidity sensor 240J, an illumination sensor 240K, and an Ultra Violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, a finger print sensor, etc. The sensor module 240 may further include a control circuit for controlling at least one or more of the sensors included in the sensor module 540. The electronic device 201 may further include a processor configured to control the sensor module 240 as a part of or separate from the processor 210, to control the sensor module 240 while the processor 210 is in sleep state.

The input device 250 may include a touch panel 252, a (digital) pen sensor 254, a key 256, or an ultrasonic input device 258.

The touch panel 252 may employ at least one of a capacitive, resistive, infrared, and ultrasonic method. The touch panel 252 may further include a control circuit. The touch panel 252 may further include a tactile layer for providing the user with haptic sensation.

The (digital) pen sensor 254 may be a part of the touch panel 252, or include a separate sheet for recognition.

The key 256 may include a physical button, optical key or key pad.

The ultrasonic input device 258 detects ultrasounds originated from an input tool through a microphone 288 to determine data corresponding to the detected ultrasounds.

The display 260 may include a panel 262, a hologram device 264, or a projector 266.

The panel 262 may be configured in the same or a similar manner as the display 160 of FIG. 1. The panel 262 may be implemented to be flexible, transparent, or wearable. The panel 262 may also be incorporated with the touch panel 1152 in a single module.

The hologram device 264 displays three dimensional (3D) images (holograms) in the air by using light interference.

The projector 266 displays an image by projecting light onto a screen. The screen may be located inside or outside of the electronic device 201.

The display 260 may further include a control circuit to control the panel 262, the hologram device 264, or the projector 266.

The interface 270 may include a high definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 may include a mobile high-definition link (MHL) interface, an SD card/an MMC interface, or infrared data association (IrDA) standard interface.

The audio module 280 converts between sound into electric signals and vice versa. At least a part of the audio module 280 may be included in the I/O interface 145 as shown in FIG. 1. The audio module 280 processes sound information input or output through a speaker 282, a receiver 284, an earphone 286, or the microphone 288.

The camera module 291 is a device for capturing still images and videos, and may include one or more image sensors (e.g., front and back sensors), a lens, an Image Signal Processor (ISP), or a flash, such as an LED or xenon lamp.

The power manager module 295 manages power of the electronic device 201. A power management integrated circuit (PMIC), a charger IC, or a battery gauge may be included in the power manager module 295. The PMIC may have wired and/or wireless charging schemes. The wireless charging scheme may include a magnetic resonance scheme, a magnetic induction scheme, or an electromagnetic wave based scheme, and an additional circuit, such as a coil loop, a resonance circuit, a rectifier, etc. may be added for wireless charging. The battery gauge measures an amount of remaining power, a voltage, a current, or a temperature while charging of the battery 296. The battery 296 may include, e.g., a rechargeable battery or a solar battery.

The indicator 297 indicates a particular state of the electronic device 201 or a part of the electronic device (e.g., the processor 210), the particular state including e.g., a booting state, a message state, or charging state.

The motor 298 converts an electric signal to a mechanical vibration, and produces vibration or haptic effects. Although not shown, a processing unit for supporting mobile TV, such as a GPU may be included in the electronic device 201. The processing unit for supporting mobile TV processes media data conforming to a standard for digital multimedia broadcasting (DMB), digital video broadcasting (DVB), or mediaFLo™.

Each of the aforementioned components of the present disclosure may include one or more components, and a name of the component may vary with a type of the electronic device. The electronic device may include at least one of the aforementioned components, omit some of them, or include other additional components. Some of the components may be combined into an entity, in this case the combined entity performs the same functions as the individual components do.

Figure 3:
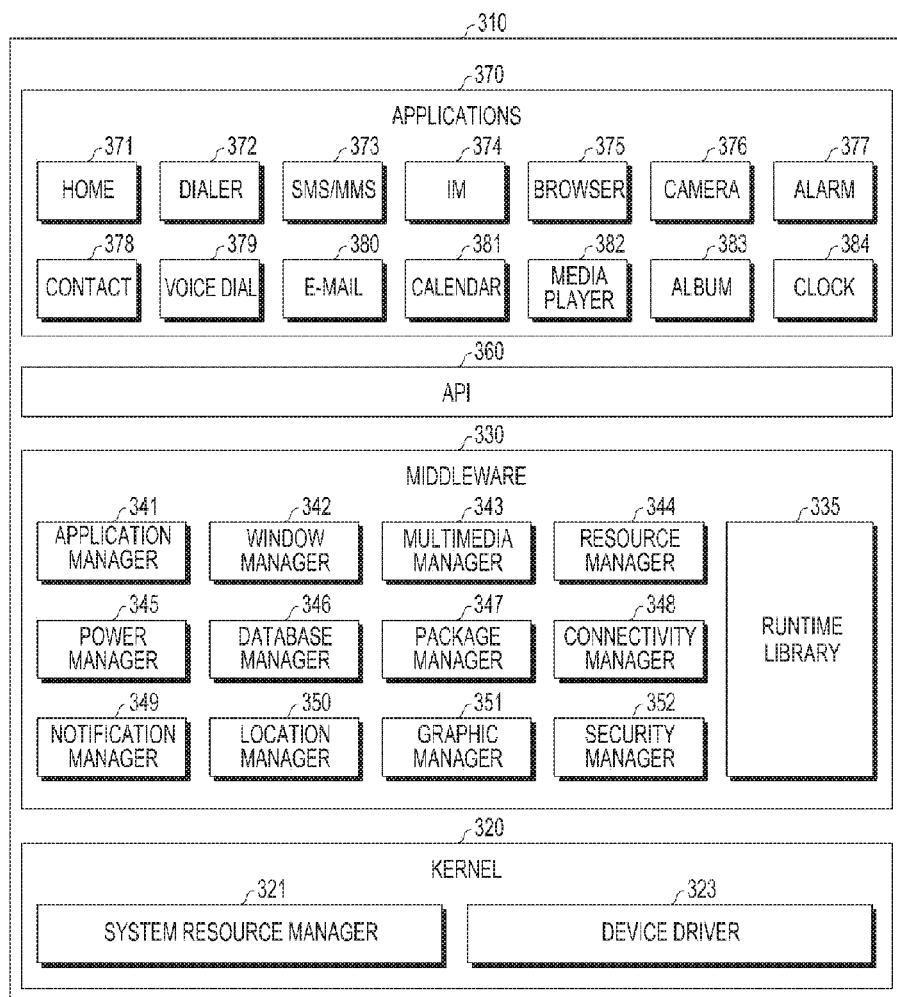
FIG. 3 is a block diagram of a configuration of a program module, according to an embodiment of the present disclosure.

FIG. 3 is a block diagram of a configuration of a program module, according to an embodiment of the present disclosure.

Referring to FIG. 3, disclosure program module 310 is provided. The program module 310 (corresponding to the program 140 of FIG. 1) may include an OS for controlling resources associated with the electronic device 101 and/or various applications (e.g., including the application programs 147) running under the OS. The OS may be e.g., Android, iOS, Windows, Symbian, Tizen, Bada, or like.

The program module 310 may include a kernel 320, a middleware 330, an API 360, and/or applications 370. At least a part of the program module 310 may be preloaded onto the electronic device 101, or may be downloaded from the external electronic devices 102 or 104, or the server 106.

The kernel 320 may include a system resource manager 321 and/or a device driver 323.

The system resource manager 321 performs control, allocation or retrieval of the system resource. The system resource manager 321 includes a process manager, a memory manager, a file system manager, etc. The device driver 323 may include, for example, a display driver, a camera driver, a BT driver, a shared memory driver, a USB driver, a keypad driver, a Wi-Fi driver, an audio driver, or an inter-process communication (IPC) driver.

The middleware 330 provides a function commonly required by the applications 370, or provides the applications 370 with various functions through the API 360 for the applications 370 to efficiently use limited system resources in the electronic device 101. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 is a library module used by a compiler to add a new function through a programming language while the applications 370 are running. The runtime library 335 performs input/output management, memory management, or arithmetic functions.

The application manager 341 manages a life cycle of at least one application among the applications 370.

The window manager 342 manages GUI resources used for a screen of the electronic device 101.

The multimedia manager 343 determines a format required to reproduce various media files, and performs encoding or decoding of the media file with a codec that conforms to the format.

The resource manager 344 manages resources, such as source codes of at least one of the applications 370, memory or storage capacity, etc.

The power manager 345 operates with a basic input/output system (BIOS) to manage the battery or power and provides power information required for operation of the electronic device 101.

The database manager 346 creates, searches, or changes a database to be used by at least one of the applications 370.

The package manager 347 manages installing or updating of an application distributed in the form of a package file.

The connectivity manager 348 manages wireless connection, e.g., Wi-Fi or Bluetooth.

The notification manager 349 displays or notifies of an event, such as message arrival, appointment, proximity, etc., in a way so as not to disturb a user of the electronic device 101.

The location manager 350 manages location information of the electronic device 101.

The graphic manager 351 manages graphic effects or associated user interface to be provided to the user.

The security manager 352 provides an overall security function required for system security, user authentication, etc.

If the electronic device 101 includes a phone functionality, the middleware 330 may further include a telephony manager to manage voice or video call functions of the electronic device 101.

The middleware 330 is a module that may constitute any combination of various functions of the aforementioned components. The middleware 330 provides a specialized module for each type of OS to provide a specialized function. Furthermore, the middleware 330 may dynamically delete some of the existing components or add new components.

The API 360 is a set of API programming functions, and may be differently configured depending on the OS. For example, in the case of Android or iOS, an API set may be provided for each platform, and in the case of Tizen, two or more API sets may be provided for each platform.

The applications 370 may include one or more applications that provide functions or information about, for example, home 371, dialer 372, SMS/MMS 373, Instant Messaging (IM) 374, browser 375, camera 376, alarm 377, contacts 378, voice dial 379, email 380, calendar 381, media player 1782, album 383, and clock 384. The applications 370 may additionally or alternatively include one or more applications for healthcare (e.g., amount of exercise or blood sugar measurement), environmental information (e.g., atmospheric pressure, temperature, etc.), or the like.

The applications 370 may include an information exchange application that supports exchange of information between the electronic device 101 and the external electronic devices 102 and 104. The application involved in such information exchange may include a notification relay application for relaying particular information to the external electronic device 102 104 or a device management application for managing the external electronic device 104.

The notification relay application notifies the external electronic devices 102 or 104 of notification information generated in another application (e.g., the SMS/MMS application, the Email application, the healthcare application, or the environmental information application) of the electronic device 101. For example, the notification relay application may receive notification information from the external electronic device 102 or 104 and provide the information to the user.

The device manager application manages (e.g., installs, deletes, or updates) a function (e.g., turning on/off the external electronic device 102 or 104 itself or a part of the external electronic device, or controlling display brightness of the external electronic device) of the external electronic device 102 or 104 in communication with the electronic device 101, or a service (e.g., calling or messaging service) provided by the external electronic device 102 or 104 or an application running in the external electronic device.

The applications 370 may include an attribute (or an application designated according to the attribute) of the external electronic device 102 or 104 (e.g., a healthcare application of a mobile healthcare device). The applications 370 may include an application received from the external electronic device 102 or 104 or the server 106. The applications 370 may include a preloaded application or a third party application that may be downloaded from the server 106. Terms of the components of the program module 310 shown in the embodiment may depend on types of OS.

At least a part of the program module 310 may be implemented in software, firmware, hardware, or a combination of two or more of them. At least a part of the programming module 310 may be implemented or run by the processor 210. At least a part of the programming module 310 may include e.g., a module, program, routine, set of instructions, process, etc. for performing one or more functions. The term "module" may refer to a unit including one of hardware, software, and firmware, or a combination thereof. The term "module" may be interchangeably used with the terms unit, logic, logical block, component, or circuit. The module may be a minimum unit or part of an integrated component. The module may be a minimum unit or part of performing one or more functions. The module may be mechanically or electrically implemented. For example, the module may include at least one of application specific integrated circuit (ASIC) chips, field programmable gate arrays (FPGAs), or programmable logic arrays (PLAs) that perform some operations, which have already been known or will be developed in the future.

According to various embodiments of the present disclosure, at least a part of the device (e.g., modules or their functions) or method (e.g., operations) may be implemented as program instructions stored in a computer-readable storage medium e.g., in the form of the program module 310. The instructions, when executed by the processor 120, may cause the processor 120 to carry out a corresponding function. The computer-readable storage medium may be the memory 130.

The computer-readable storage medium may include a hard disk, a floppy disk, a magnetic medium (e.g., magnetic tape), an optical medium (e.g., CD-ROM, DVD, magneto-optical medium, such as floptical disk), a hardware device (e.g., ROM, RAM, flash memory, etc.). Examples of the program instructions may include not only machine language codes, but also high-level language codes, which are executable by various computing means using an interpreter. The aforementioned hardware devices may be configured to operate as one or more software modules to carry out various embodiments of the present disclosure, and vice versa.

According to various embodiments of the present disclosure, modules or program modules e may include at least one or more of the aforementioned components, omit some of them, or further include other additional components. Operations performed by modules, program modules or other components t invention may be carried out sequentially, simultaneously, repeatedly, or heuristically. Furthermore, some of the operations may be performed in a different order, or omitted, or include other additional operations.

The embodiments as described in the specification are provided for the purpose of describing and understanding of technical concept of the present disclosure. Accordingly, the scope of the present disclosure should be construed as including all the modifications or other various embodiments based on the technical idea of the present disclosure.

Figure 4:
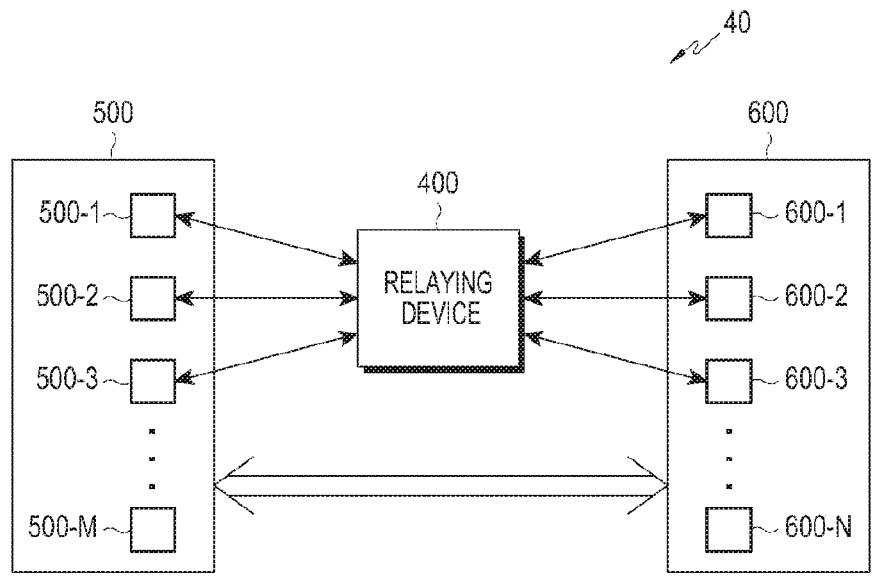
FIG. 4 is a schematic block diagram of an electronic system, according to an embodiment of the present disclosure.

FIG. 4 is a schematic block diagram of an electronic system, according to an embodiment of the present disclosure.

Referring to FIG. 4, an electronic system 40 includes a relaying device 400, first electronic devices 500, and second electronic devices 600.

The electronic system 40 is a system in which the first and second electronic devices 500 and 600 are connected to the relaying device 400 through wireless communication for performing an event under the control of the relaying device 400.

The event is a particular process or particular operation performed or executed in the first or second electronic devices 500 or 600.

For example, the event may correspond to receiving a phone call, making a phone call, capturing an image with a camera, sending/receiving email, operating an alarm, checking a schedule, sound generation, light generation, transmitting/receiving a Short Message Service (SMS), transmitting/receiving a Multi-Media Service (MMS), running various applications, etc., and/or an operation to request the particular operation of the electronic device.

The first electronic devices 500 is connected to the second electronic devices 600 through the relaying device 400 by means of the wireless communication. Furthermore, the first electronic devices 500 may be directly connected to the second electronic devices 600 by wireless communication under the control of the relaying device 400.

The first electronic devices 500 transmits/receives information or data to/from the second electronic devices under the control of the relaying device 400. In addition, the first electronic devices 500 performs or executes events that occur in the first electronic devices 500, under the control of the relaying device 400.

The first electronic devices 500 may include a plurality of electronic devices 500-1, . . . , 500-M, M is a natural number equal to or greater than 2. The second electronic devices 600 may include a plurality of electronic devices 600-1, . . . , 600-N, N is a natural number greater than or equal to 2.

Each of the first and second devices 500 and 600 (e.g., 500-1, . . . , 500-M, 600-1, . . . , 600-N) may be implemented to be substantially identical to the electronic devices 101 or 201 as shown in FIGS. 1 and 2.

The first electronic devices 500 refer to electronic devices from which events occur. The second electronic devices 600 refer to electronic devices that perform or execute the events that occur in the first electronic devices 500, under the control of the relaying device 400.

The relaying device 400 connects the first electronic devices 500 and the second electronic devices 600 by relaying or directly.

The relaying device 400 may connect the first electronic devices 500 and the second electronic devices 600 by relaying or directly based on a type of the event. Furthermore, the relaying device 400 may connect the first electronic devices 500 and the second electronic devices 600 by relaying or directly based on capabilities of the first and second electronic devices 500 and 600 (for example, wireless communication technologies of the second electronic devices 600).

For example, the relaying device 400 may control the first and second electronic device 500 and 600 such that one of the second electronic devices 600, which has the best throughput, performs the event that occurs in at least one of the first electronic devices 500.

Figure 5:
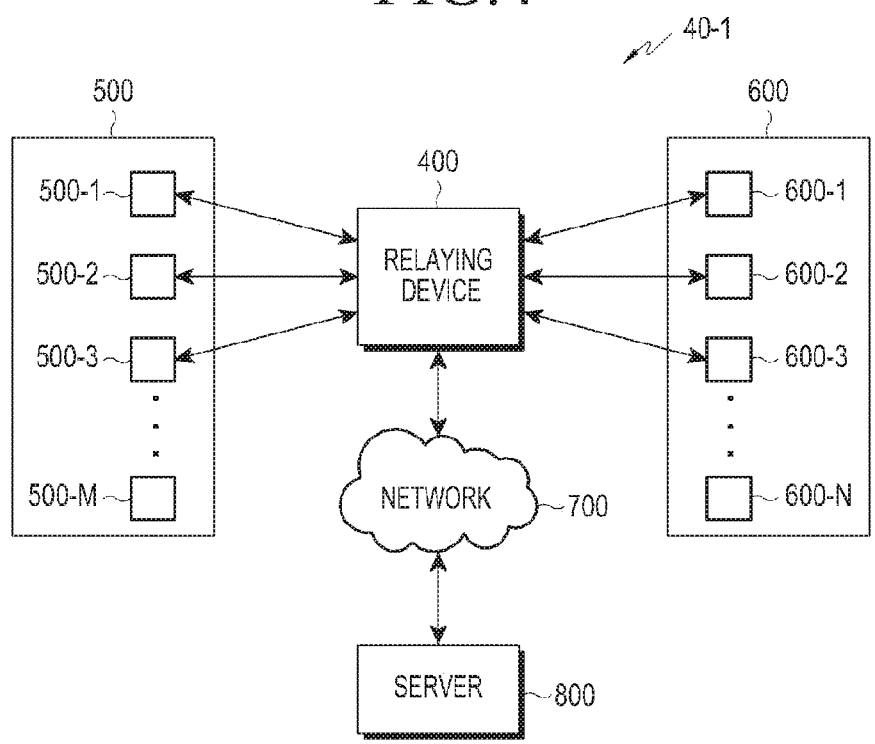
FIG. 5 is a schematic block diagram of an electronic system, according to an embodiment of the present disclosure.

FIG. 5 is a schematic block diagram of an electronic system, according to an embodiment of the present disclosure.

Referring to FIG. 5, an electronic system 40-1 includes the relaying device 400, the first electronic devices 500, the second electronic devices 600, a network 700, and a server 800.

The electronic system 40-1 may be implemented to be substantially identical or similar to the electronic system 40 as shown in FIG. 4, except for addition of the network 700 and the server 800.

The relaying device 400 is connected to the server 800 through the network 700. The relaying device 400 may also be connected to other electronic devices, such as the second external electronic device 104 of FIG. 1, through the network 700.

The relaying device 400 transmits and receives information or data to and from the server 800 over the network 700.

For example, the relaying device 400 may transmit information about the first electronic devices 500 and/or the second electronic devices 600 to the server 800 over the network 700 using a wired or wireless communication technology. Also, the relaying device 400 may receive information about the first electronic devices 500 and/or second electronic devices 600 from the server 800 over the network 700.

The network 700 may be implemented to be substantially identical or similar to the network 162 as shown in FIG. 1.

The server 800 may be implemented to be substantially identical or similar to the server 106 as shown in FIG. 1.

In some embodiments, the server 800 may receive information about the first and second electronic devices 500 and 600 from the relaying device 400 over the network 700. Furthermore, the server 800 may receive information about an event or events that occur in the first and second electronic devices 500 and 600 from the relaying device 400 over the network 700.

The server 800 stores the information about the first and second electronic devices 600. The server 800 also stores the information about the event that occurs in the first and second electronic devices 600.

The server 800 transmits the information about the first and second electronic devices 500 and 600 to the relaying device 400 over the network 700. Also, the server 800 transmits the information about an event or events that occur in the first and second electronic devices 500 and 600 to the relaying device 400 over the network 700.

Figure 6A:
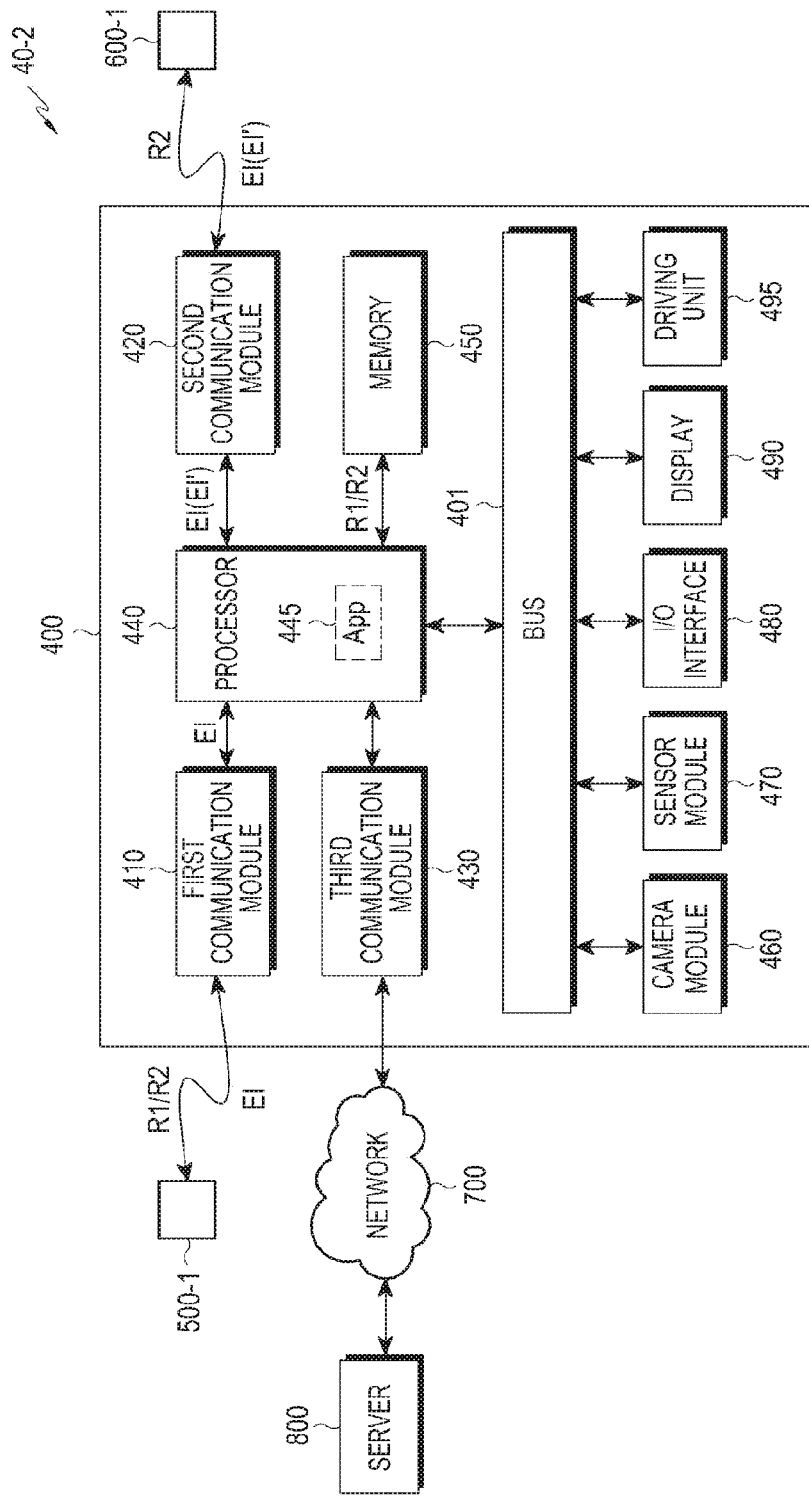
FIGS. 6A and 6B are schematic block diagrams of an electronic system, according to an embodiment of the present disclosure.
Figure 6B:
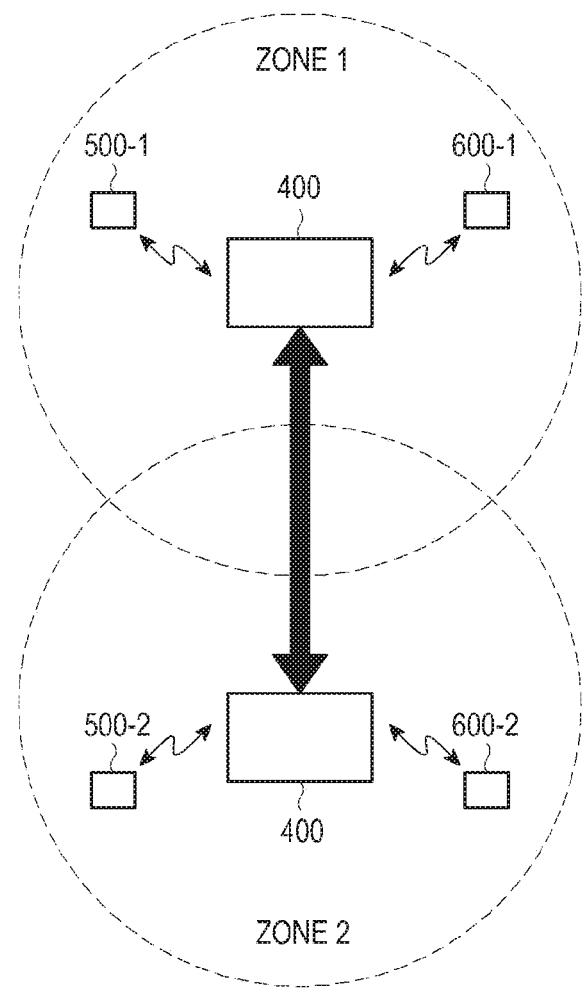

FIGS. 6A and 6B are schematic block diagrams of an electronic system, according to an embodiment of the present disclosure.

Referring to FIG. 6A, an electronic system 40-2 includes the relaying device 400, a first electronic device 500-1, a second electronic device 600-1, the network 700, and the server 800.

The electronic system 40-2 may be implemented to be substantially identical or similar to the electronic systems 40 or 40-1 as shown in FIGS. 4 and 5.

The first electronic device 500-1 is an electronic device from which an event occurs, among the first electronic devices 500.

The second electronic device 600-1 is an electronic device that performs or executes the event that occurs in the first electronic device 500-1, among the second electronic devices 600.

The relaying device 400 may be connected to the first electronic device 500-1 and the second electronic device 600-1 by means of a wireless communication technology. The relaying device 400 may also be connected to the server 800 and/or other electronic device over the network 700.

The relaying device 400 controls the first electronic device 500-1 and the second electronic device 600-1 such that an event that occurs in the first electronic device 500-1 is to be performed in the second electronic device 600-1.

The relaying device 400 may be connected to the first electronic device 500-1 and the second electronic device 600-1 by working with the first and second electronic devices 500-1 and 600-1. For example, the first electronic device 500-1 and the second electronic device 600-1 may each include an application to work with the relaying device 400 for connection. In this case, the application authorizes the relaying device 400 to control the first electronic device 500-1 and the second electronic device 600-1.

The relaying device 400 may include a bus 401, a first communication module 410, a second communication module 420, a third communication module 430, a processor 440, a memory 450, a camera module 460, a sensor module 470, an I/O interface 480, a display 490, and a driving unit 495.

The processor 440, camera module 460, sensor module 470, I/O interface 480, and display 490 are connected to the bus 401 for exchanging data via the bus 401.

The first communication module 410 is connected to the first electronic device 500-1 for exchanging information or data with the first electronic device 500-1.

The first communication module 410 receives first registration information R1 for the first electronic device 500-1 when the first electronic device 500-1 is registered in the relaying device 400.

The first registration information R1 includes information about the first electronic device 500-1.

In some embodiments, the first registration information R1 includes information for the first electronic device 500-1 to be connected to the second electronic device 600-1 through the relaying device 400. Furthermore, the first registration information R1 may be information for the second electronic device 600-1 to perform an event that occurs in the first electronic device 500-1. The relaying device 400 controls the first electronic device 500-1 using the registration information R1.

For example, the first registration information R1 may include contact information, a call log, a Bluetooth ID, a Wi-Fi MAC address, a communication scheme, functionality, and/or AP information, which are stored in the first electronic device 500-1.

The first communication module 410 may additionally receive event information EI regarding an event from the first electronic device 500-1. The first communication module 410 may also send the event information EI to the first electronic device 500-1.

The event information EI is information regarding an event that occurs in the first electronic device 500-1. For example, the event information EI includes all information required for the second electronic device 600-1 to perform the event that occurs in the first electronic device 500-1.

The first communication module 410 sends the registration information R1 and the event information EI to the processor 440.

The second communication module 420 is connected to the second electronic device 600-1 for exchanging information or data with the second electronic device 600-1.

The second communication module 420 receives second registration information R2 of the second electronic device 600-1 when the second electronic device 600-1 is registered in the relaying device 400.

The second registration information R2 includes information about the second electronic device 600-1.

In some embodiments, the second registration information R2 includes information for the second electronic device 600-1 to be connected to the first electronic device 500-1 through the relaying device 400. Furthermore, the second registration information R2 may be information for the second electronic device 600-1 to perform an event that occurs in the first electronic device 500-1. The relaying device 400 controls the second electronic device 600-1 using the second registration information R2.

For example, the second registration information R2 includes contact information, a call log, a Bluetooth ID, a Wi-Fi MAC address, a communication scheme, functionality, and/or AP information, which are stored in the second electronic device 600-1.

The second communication module 420 receives, from the processor 440, the event information EI sent from the first communication module 410 and may also receive event information EI'. That is, the processor 440 may generate the event information EI' by changing the communication scheme for the event information EI. For example, the processor 440 may receive event information EI from the first communication module 410 in a first wireless communication scheme, and send, to the second communication module 420, event information EI' changed into a second wireless communication scheme different from the first wireless communication scheme.

In some embodiments, the second communication module 420 may send the event information EI or EI' received from the processor 440 to a second electronic device 600-2. Furthermore, the second communication module 420 may send the event information EI or EI' received from the second electronic device 600-2 to the processor 440.

The first and second communication modules 410 and 420 may each include a plurality of communication modules. For example, the first and second communication modules 410 and 420 may each include a plurality of Bluetooth modules, a plurality of Wi-Fi modules, a plurality of Zigbee modules, a plurality of ultra wide band (UWB) modules, a plurality of Zwave modules, and/or a plurality of ANT+ modules.

With the first and second communication modules 410 and 420, a plurality of electronic devices may be connected to the relaying device 400.

Although communication modules connected to the first and second electronic devices 500-1 and 600-1 are separately identified as the first and second communication modules 410 and 420, respectively, in FIG. 6A, the first and second communication modules 410 and 420 may be implemented in a single communication module. For example, the plurality of electronic devices 500 may be connected to the plurality of electronic devices 600 through a single communication module into which the first and second communication modules are integrated. Furthermore, the plurality of electronic devices 500 may exchange data with the plurality of electronic devices 600 through the single communication module into which the first and second communication modules are integrated.

The third communication module 430 is connected to the server 800 through the network 700 for exchanging information or data with the server 800.

The third communication module 430 sends the first and second registration information R1 and R2 to the server 800. The third communication module 430 may also send the event information EI or EI' to the server 800.

In some embodiments, the third communication module 430 may receive information about the first electronic device 500-1 and information about the second electronic device 600-1, which may be stored in the server 800. The information about the first electronic device 500-1 may include the first registration information R1 and other optional information. The information about the second electronic device 600-1 may include the second registration information R2 and other optional information.

The third communication module 430 sends the server 800 the first registration information R1, second registration information R2, and/or event information EI or EI' received from the processor 440. The third communication module 420 sends the processor 440 information about the first electronic device 500-1 and information about the second electronic device 600-1 received from the server 800.

The processor 440 controls general operation of the relaying device 400.

In some embodiments, the processor 440 controls the first and second communication modules 410 and 420 to connect the first and second electronic devices 500-1 and 600-1. Furthermore, the processor 440 controls the first and second communication modules 410 and 420 for an event that occurs in the first electronic device 500-1 to be performed in the second electronic device 600-1.

Moreover, the processor 440 controls the first and second electronic devices 500-1 and 600-1 through the first and second communication modules 410 and 420, respectively, for an event that occurs in the first electronic device 500-1 to be performed in the second electronic device 600-1.

The processor 440 sends the first and second registration information R1 and R2 to the memory 450. The processor 440 may also send the event information EI or EI' to the memory 450.

The processor 440 sends the event information EI to the first communication module 410 or the second communication module 420.

The processor 440 may receive information about the first electronic device 500-1 and information about the second electronic device 600-1 from the third communication module 430. The processor 440 controls the first and second electronic devices 500-1 and 600-1 based on the information about the first electronic device 500-1 and the information about the second electronic device 600-1 received from the third communication module 430.

The processor 440 may obtain information regarding locations of the first and second electronic devices 500-1 and 600-1 and locations of the users based on information received from the camera module 460 and/or the sensor module 470. The processor 440 may use the location information to control the first and second electronic devices 500-1 and 600-1.

For example, based on information regarding the locations of the users and the locations of the first and second electronic devices 500-1 and 600-1, the processor 440 determines whether to connect the first and second electronic devices 500-1 and 600-1.

The application 445 may be executed in the processor 440 for controlling general operation of the relaying device 400. For example, in the case that the memory 450 is implemented with a non-volatile memory, when the electronic device 400 is booted up, the application 445 stored in the memory 450 may be loaded into an internal memory and executed by the processor 440. The internal memory may be implemented with a volatile memory. For example, the internal memory may be implemented with a DRAM, SRAM, or ROM.

In some embodiments, the application 445 controls the processor 440 for an event that occurs in the first electronic device 500-1 to be performed in the second electronic device 600-1. The application 445 may operate in conjunction with applications running in the first electronic device 500-1 and the second electronic device 600-1.

The memory 450 stores the first and second registration information R1 and R2. The memory 450 may also store the event information EI.

The memory 450 may be implemented to be substantially identical or similar to the memory 130 as shown in FIG. 1. In some embodiments, the memory 450 may be implemented with a non-volatile memory.

The camera module 460 captures images of the first and second electronic devices 500-1 and 600-1, and sends the images to the processor 440. The processor 440 obtains information regarding the locations of the first and second electronic devices 500-1 and 600-1 based on the captured images sent from the camera module 460. The processor 440 may also obtain information about a location of the user based on the captured image sent from the camera module 460.

The camera module 460 may be implemented to be substantially identical or similar to the camera module 291 as shown in FIG. 2.

The sensor module 470 measures a physical quantity or detects a state of operation of the first and/or second devices 500-1 and/or 600-1, and sends the measured or detected information to the processor 440. The processor 440 may obtain information regarding locations of the first and second electronic devices 500-1 and 600-1 based on the measured or detected information sent from the sensor module 470. The processor 440 may also obtain information about a location of the user based on the measured or detected information sent from the sensor module 470.

The sensor module 470 may be implemented to be substantially identical or similar to the sensor module 240 as shown in FIG. 2.

Based on the location information obtained from at least one of the camera module 460 and the sensor module 470, the processor 440 controls the relaying device 400 for an event that occurs in the first electronic device 500-1 to be performed in one of the second electronic devices 600, which is at the nearest distance to the location of the user, e.g., second electronic device 600-1.

The user controls the relaying device 400 through the I/O interface 480. The user may also check a state of operation of the relaying device 400 through the I/O interface 480.

The I/O interface 480 may be implemented to be substantially identical or similar to the interface 270 as shown in FIG. 2.

The display 490 displays a state of operation of the relaying device 400. For example, the display 490 displays a state of connection of the first electronic device 500-1 and the second electronic device 600-1.

Furthermore, the display 490 may include a touch panel, and the user may control the relaying device 400 through the touch panel.

The driving unit 495 includes devices that are capable of moving the relaying device 400 under the control of the processor 440. For example, the driving unit 495 includes at least one of motors, wheels, wings, propellers, and moving devices. The relaying device 400 may be implemented with a movable robot including the driving unit 495.

FIG. 6B is a schematic block diagram of an electronic system, according to an embodiment of the present disclosure.

Referring to FIG. 6B, the processor 440 determines communication coverage of the first and second electronic devices 500-1 and 600-1. For example, the processor 440 determines the communication coverage, e.g., ZONE1, of the first and second electronic devices 500-1 and 600-1 based on the first and second registration information R1 and R2.

If the processor 440 determines that it is difficult to make a direct connection or relayed connection between the first and second electronic devices 500-1 and 600-1, it may determine to move the relaying device 400. For example, if the relaying device 400 is out of the communication coverage of the first and second electronic devices 500-1 and 600-1, the processor 440 controls the driving unit 495 to move the relaying device 400.

If a direct connection or relayed connection between the first and second electronic devices 500-2 and 600-2 is required, the processor 440 controls the driving unit 495 to move the relaying device 400. For example, the relaying device 400 may be moved from the first communication coverage ZONE1 into second communication coverage ZONE2.

For example, the first communication coverage ZONE1 is an area within which at least one, e.g., 500-1 of the first electronic devices 500 may be connected to at least one, e.g., 600-1 of the second electronic devices 600 via the relaying device 400, and the second communication coverage ZONE2 is an area within which at least one, e.g., 500-2 of the first electronic devices 500 may be connected to at least one, e.g., 600-2 of the second electronic devices 600 via the relaying device 400.

In some embodiments, the processor 440 determines whether to make a direct connection or make a relayed connection between the first and second electronic devices 500-1 and 600-1.

In the case of making a direct connection between the first and second electronic devices 500-1 and 600-1, the processor 440 controls the driving unit 495 to move the relaying device 400 to an optimum location that enables direct connection between first and second electronic devices 500-1 and 600-1.

In the case of making a relayed connection between the first and second electronic devices 500-1 and 600-1, the processor 440 controls the driving unit 495 to move the relaying device 400 to an optimum location that enables relayed connection between the first and second electronic devices 500-1 and 600-1.

That is, the processor 440 controls the driving unit 495 to move the relaying device 400 into the communication coverage ZONE1 or ZONE2 of at least one of the first electronic devices 500, e.g., first electronic devices 500-1 or 500-2 or at least one of the second electronic devices 600, e.g., second electronic devices 600-1 or 600-2.

In some embodiments, the relaying device 400 may be implemented as a repeater or a mobile repeater. For example, the relaying device 400 may resume a new connection if it grows distant from the communication coverage of the first or second electronic devices 500 or 600, e.g., if the intensity of the wireless communication signal becomes weak. Furthermore, the relaying device 400 may use the driving unit 495 to be moved into an optimum communication coverage, e.g., ZONE1 and ZONE2, if the signal propagation distance for the first and second electronic devices 500 and 600 becomes farther.

In addition, in the case that the relaying device 400 is implemented as a repeater, if the existing state of connection is poor, the relaying device 400 may release the existing connection and resume a new connection.

Figure 7:
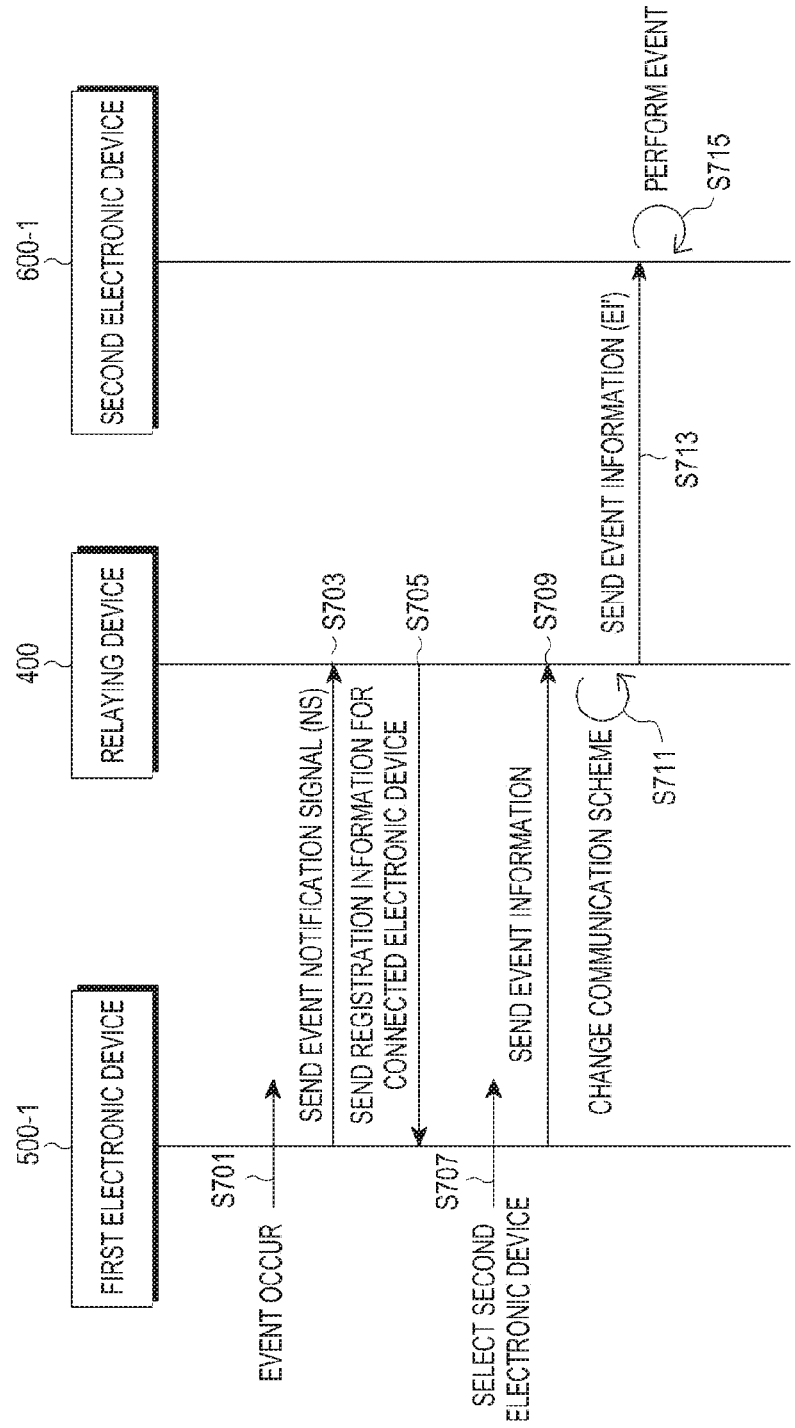
FIG. 7 is a data flow diagram of an operating method of a relaying device when a first and second electronic device are unable to directly connect, according to an embodiment of the present disclosure.

FIG. 7 is a data flow diagram of an operating method of a relaying device when a first and second electronic device are unable to directly connect, according to an embodiment of the present disclosure.

Referring to FIG. 7, the relaying device 400, the first electronic device 500-1, and the second electronic device 600-1 are provided. The relaying device 400 may register the first electronic device 500-1 and the second electronic devices. For example, the relaying device 400 may obtain the first and second registration information R1 and R2 from the first and second electronic devices 500-1 and 600-1, respectively, when the first and second electronic devices 500-1 and 600-1 are connected to the relaying device 400. Also, the relaying device 400 may obtain the first and second registration information R1 and R2 from the server 800, when the first and second electronic devices 500-1 and 600-1 are connected to the relaying device 400. For example, the relaying device 400 may register the first and second electronic devices 500-1 and 600-1 based on the first and second registration information R1 and R2.

An event occurs in the first electronic device 500-1, in step S701. For example, the event may be an event of making or receiving a call.

The first electronic device 500-1 sends an event notification signal (NS) to the relaying device 400, in step S703. The event NS is a signal to notify the relaying device 400 of the event that occurs in the first electronic device 500-1.

The relaying device 400 sends information about the registered second electronic devices 600 to the first electronic device 500-1, in response to the event NS, in step S705. In some embodiments, the relaying device 400 sends the second registration information R2 for the registered second electronic devices 600 to the first electronic device 500-1, in step S705.

The first electronic device 500-1 selects one of the second electronic devices 600, e.g., the first electronic device 600-1, to perform an event, in step S707. In this regard, the first electronic device 500-1 may select the second electronic device 600-1 according to the user's choice or automatically by a program.

The first electronic device 500-1 sends the event information EI to the relaying device 400 under the control of the relaying device 400, in step S709, in order for the event to be performed in the selected second electronic device 600-1.

When the first and second electronic devices 500-1 and 600-1 are unable to make a direct connection to each other, the relaying device 400 relays the first and second electronic devices 500-1 and 600-1 to connect them. For example, if the first and second electronic devices 500-1 and 600-1 have different wireless communication schemes, the relaying device 400 relays the first and second electronic devices 500-1 and 600-1 to connect them.

In this case, the relaying device 400 changes the event information EI received from the first electronic device 500-1 in a first wireless communication scheme into a second wireless communication scheme of the second electronic device 600-1, in step S711. The first wireless communication scheme is the wireless communication scheme of the first electronic device 500-1, and the second wireless communication scheme is the wireless communication scheme of the second electronic device 600-1.

The relaying device 400 sends the event information EI', changed into the second wireless communication scheme, to the second electronic device 600-1, in step S713.

The second electronic device 600-1 performs the event using the event information EI' under the control of the relaying device 400, in step S715. For example, the user or the relaying device 400 may have the second electronic device 600-1 perform an event of making or receiving a call, which occurs in the first electronic device 500-1.

Figure 8:
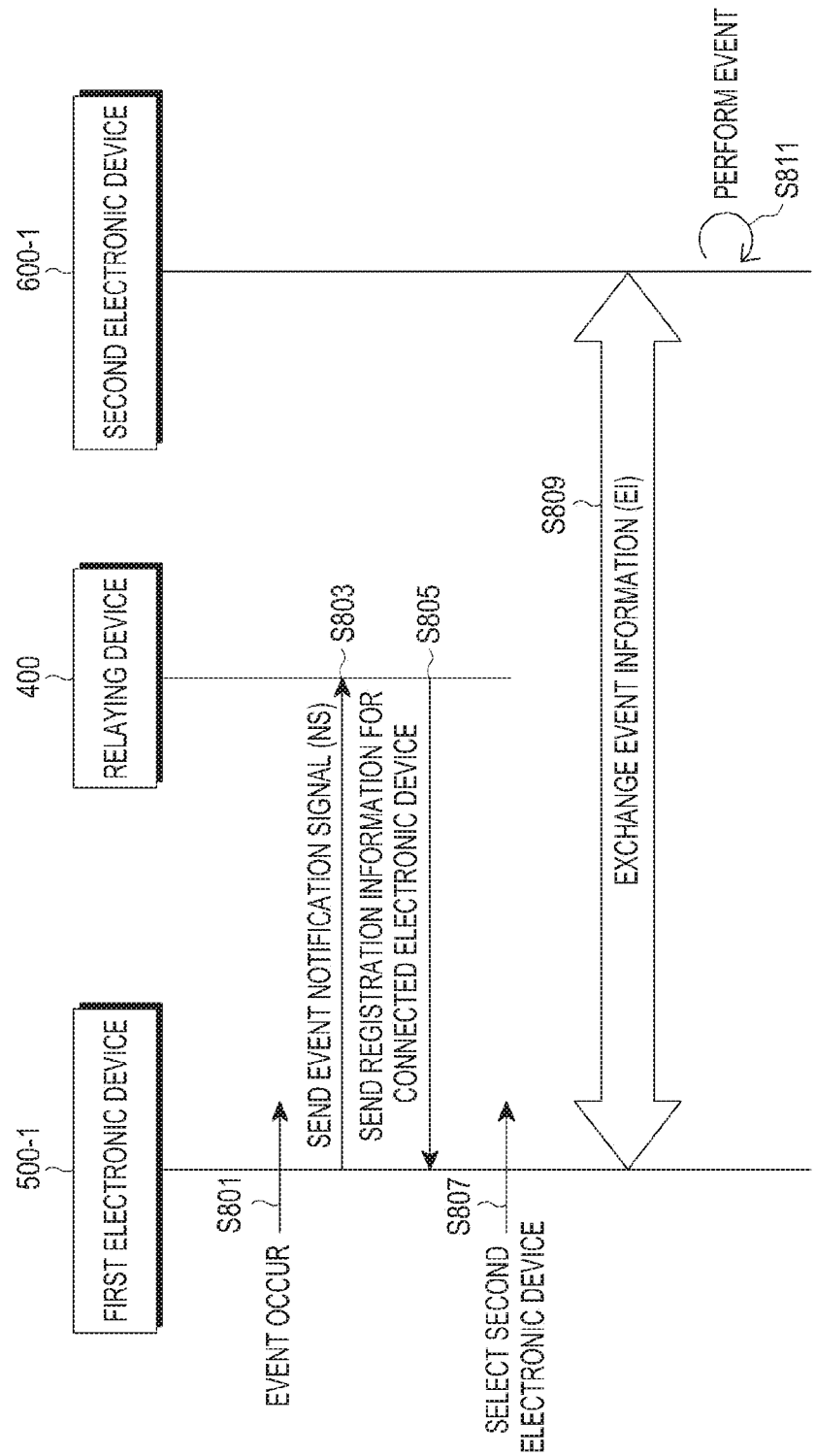
FIG. 8 is a data flow diagram of an operating method of a relaying device when a first and second electronic device are able to directly connect, according to an embodiment of the present disclosure.

FIG. 8 is a data flow diagram of an operating method of a relaying device when a first and second device are able to directly connect, according to an embodiment of the present disclosure.

Referring to FIG. 8, the relaying device 400, the first electronic device 500-1, and the second electronic device 600-1 are provided. The relaying device 400 may register the first electronic device 500-1 and the second electronic devices. For example, the relaying device 400 may obtain the first and second registration information R1 and R2 from the first and second electronic devices 500-1 and 600-1, respectively, when the first and second electronic devices 500-1 and 600-1 are connected to the relaying device 400. Also, the relaying device 400 may obtain the first and second registration information R1 and R2 from the server 800, when the first and second electronic devices 500-1 and 600-1 are connected to the relaying device 400. For example, the relaying device 400 may register the first and second electronic devices 500-1 and 600-1 based on the first and second registration information R1 and R2.

An event occurs in the first electronic device 500-1, in step S801. For example, the event may be an event of making or receiving a call.

The first electronic device 500-1 sends an event NS to the relaying device 400, in step S803.

The relaying device 400 sends information about the registered second electronic devices 600 to the first electronic device 500-1, in response to the event NS, in step S805. In some embodiments, the relaying device 400 sends the second registration information R2 for the registered second electronic devices 600 to the first electronic device 500-1, in step S805.

The first electronic device 500-1 selects one of the second electronic devices 600, e.g., the second electronic device 600-1, to perform the event, in step S807. In this regard, the first electronic device 500-1 may select the second electronic device 600-1 according to the user's choice or automatically by a program.

If the first and second electronic devices 500-1 and 600-1 are able to make a direct connection to each other, the relaying device 400 directly connects the first and second electronic devices 500-1 and 600-1.

For example, if the first and second electronic devices 500-1 and 600-1 have the same wireless communication scheme, the relaying device 400 connects the first and second electronic devices 500-1 and 600-1 directly.

Specifically, the relaying device 400 connects the first and second electronic devices 500-1 and 600-1 directly based on the first and second registration information R1 and R2.

For example, the relaying device 400 may use an Internet Protocol (IP) address of the first electronic device 500-1 included in the first registration information R1 and an IP address of the second electronic device 600-1 included in the second registration information R2 to connect the first and second electronic devices 500-1 and 600-1 directly. Furthermore, the relaying device 400 may use connection authorization information for the first electronic device 500-1 included in the first registration information R1 and connection authorization information for the second electronic device 600-1 included in the second registration information R2 to connect the first and second electronic devices 500-1 and 600-1 directly.

The first electronic device 500-1 sends the event information EI directly to the second electronic device 600-1 under the control of the relaying device 400 in order for the event to be performed in the selected second electronic device 600-1, in step 809.

The second electronic device 600-1 performs the event using the event information EI under the control of the relaying device 400, in step S811. For example, the user or the relaying device 400 may have the second electronic device 600-1 perform an event of making or receiving a call, which occurs in the first electronic device 500-1.

Figure 9:
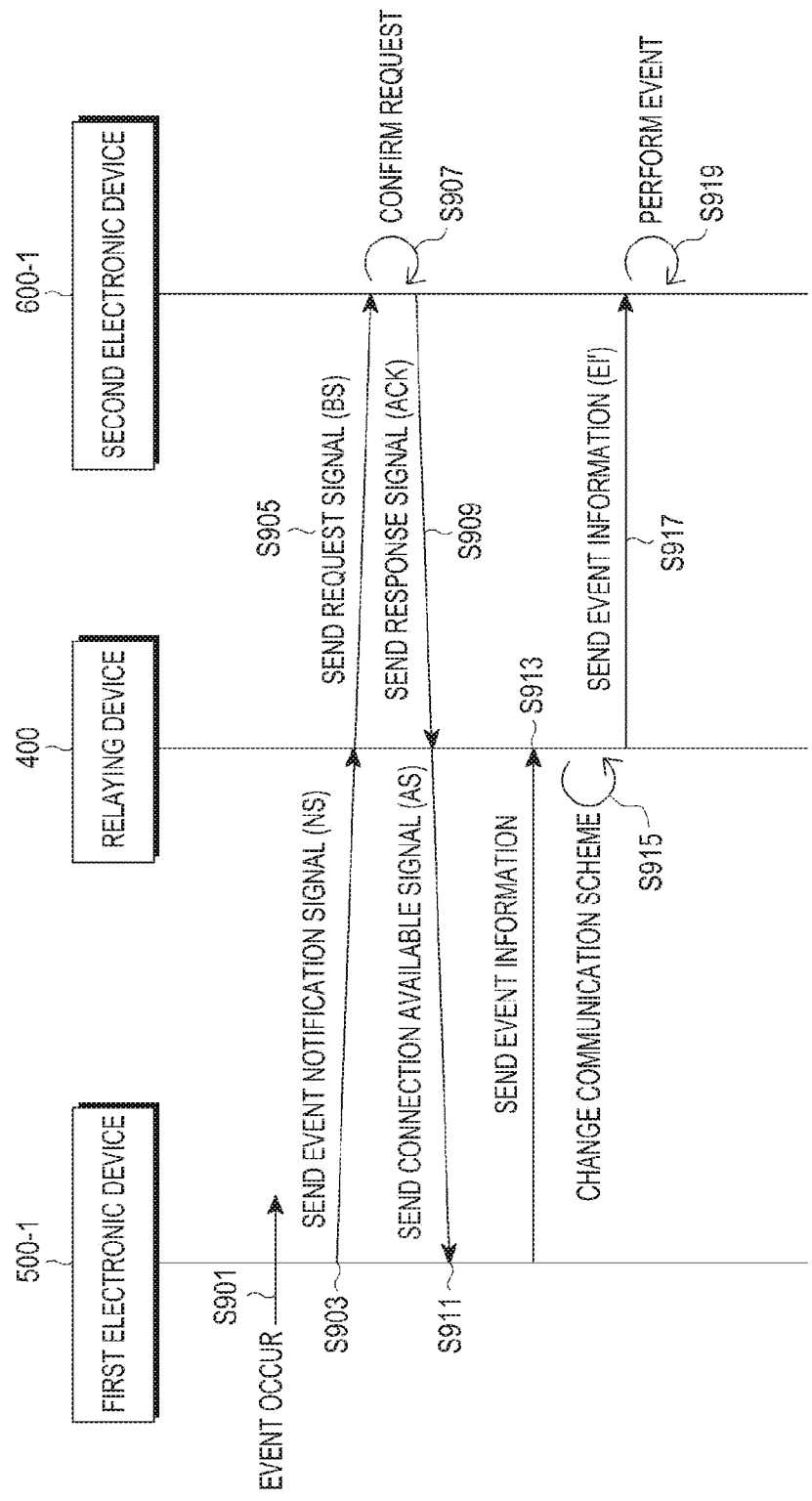
FIG. 9 is a data flow diagram of an operating method of a relaying device when a first and second electronic device are unable to directly connect, according to an embodiment of the present disclosure.

FIG. 9 is a data flow diagram of an operating method of a relaying device when a first and second electronic device are unable to directly connect, according to an embodiment of the present disclosure.

Referring to FIG. 9, the relaying device 400, the first electronic device 500-1, and the second electronic device 600-1 are provided. The relaying device 400 may register the first electronic device 500-1 and the second electronic devices. For example, the relaying device 400 may obtain the first and second registration information R1 and R2 from the first and second electronic devices 500-1 and 600-1, respectively, when the first and second electronic devices 500-1 and 600-1 are connected to the relaying device 400. Also, the relaying device 400 may obtain the first and second registration information R1 and R2 from the server 800, when the first and second electronic devices 500-1 and 600-1 are connected to the relaying device 400. For example, the relaying device 400 may register the first and second electronic devices 500-1 and 600-1 based on the first and second registration information R1 and R2.

An event occurs in the first electronic device 500-1, in step S901. For example, the event may be an event of making or receiving a call.

The first electronic device 500-1 sends an event notification signal (NS) to the relaying device 400, in step S903.

The relaying device 400 sends a request signal BS to the registered second electronic devices 600 in response to the event notification signal NS, in step S905.

The request signal BS is a signal to be sent by the relaying device 400 to the second electronic devices 600, such that an event that occurs in the first electronic device 500-1 may be performed in at least one of the second electronic devices 600.

In some embodiments, the relaying device 400 may broadcast the request signal BS to all of the second electronic devices 600. The relaying device 400 may also send the request signal BS to at least one of the second electronic devices 600, e.g., the second electronic device 600-1.

The second electronic device 600-1 confirms or approves the request to perform the event, in response to the request signal BS, in step S907. For example, the second electronic device 600-1 may confirm or approve the request according to the user's choice or automatically by a program.

The second electronic device 600-1 to perform the event sends a response signal ACK to the relaying device 400, in step S909.

The response signal ACK is a signal notifying the relaying device 400 that the second electronic device 600-1 will perform the event. The response signal ACK includes information about the second electronic device 600-1, e.g., an IP address. The response signal ACK may also include authorization information for the relaying device 400 to control the second electronic device 600-1.

The relaying device 400 sends a connection available signal AS to the first electronic device 500-1 in response to the response signal ACK, in operation S911.

The connection available signal AS is a signal notifying that the first electronic device 500-1 is available to make a connection with the second electronic device 600-1. The connection available signal AS includes information about the second electronic device 600-1. The connection available signal AS may also include the registration information R2 for the second electronic device 600-1.

The first electronic device 500-1 sends the event information EI to the relaying device 400 under the control of the relaying device 400, in step S913, in order for the event to be performed in the second electronic device 600-1.

If the first and second electronic devices 500-1 and 600-1 are unable to make direct connection to each other, the relaying device 400 may relay the first and second electronic devices 500-1 and 600-1 to connect them.

For example, if the first and second electronic devices 500-1 and 600-1 have different wireless communication schemes, the relaying device 400 relays the first and second electronic devices 500-1 and 600-1 to connect them.

The relaying device 400 changes the event information EI received from the first electronic device 500-1 in a first wireless communication scheme into a second wireless communication scheme, in step S915.

The relaying device 400 sends the event information EI' changed into the second wireless communication scheme to the second electronic device 600-1, in step S917.

The second electronic device 600-1 performs the event using the event information EI' under the control of the relaying device 400, in step S919. For example, the user or the relaying device 400 may have the second electronic device 600-1 perform an event of making a call, which occurs in the first electronic device 500-1.

Figure 10:
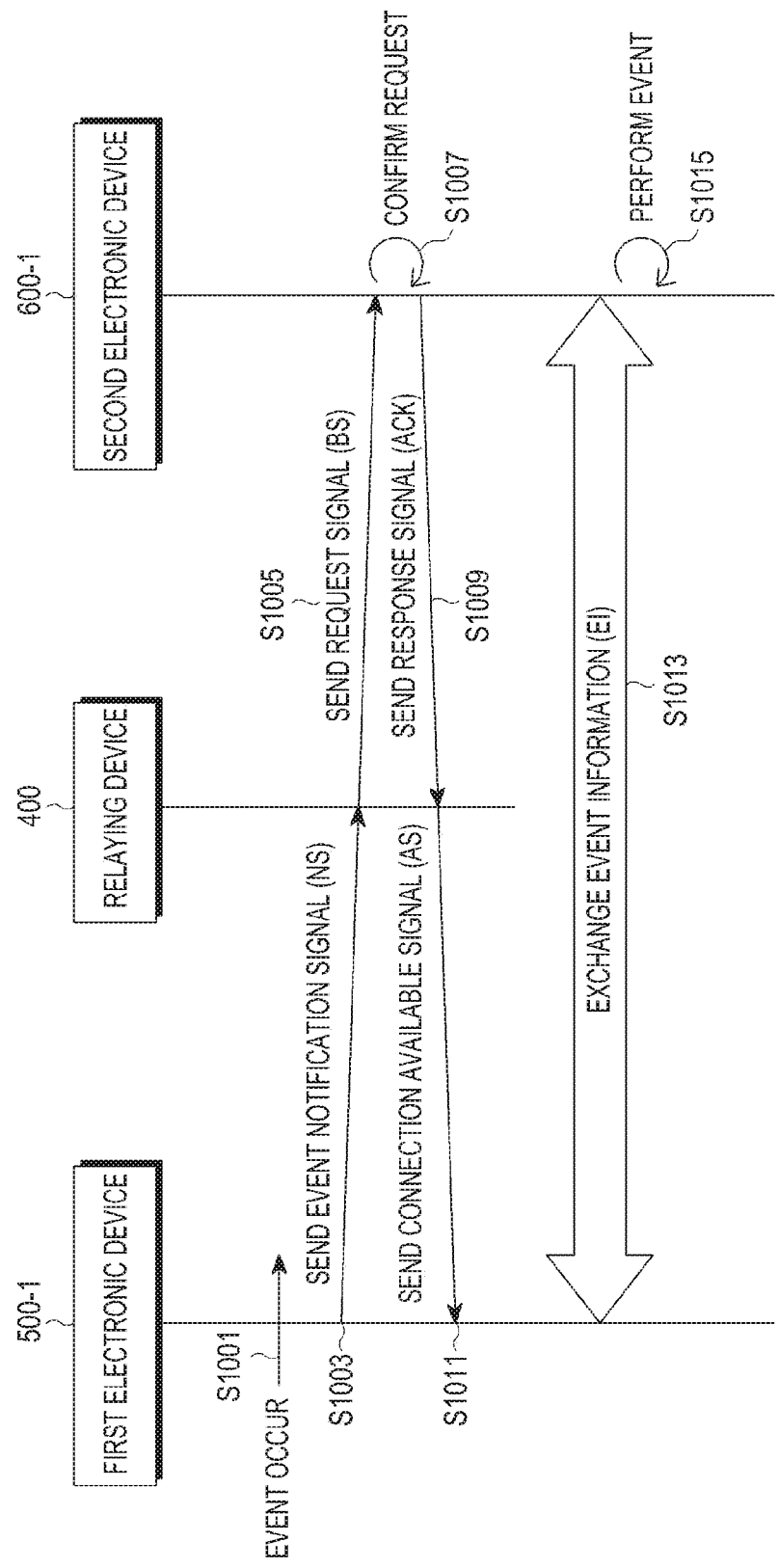
FIG. 10 is a data flow diagram of an operating method of a relaying device when a first and second electronic device are able to directly connect, according to an embodiment of the present disclosure.

FIG. 10 is a data flow diagram of an operating method of a relaying device when a first and second electronic device are able to directly connect, according to an embodiment of the present disclosure.

Referring to FIG. 10, the relaying device 400, the first electronic device 500-1, and the second electronic device 600-1 are provided. The relaying device 400 may register the first electronic device 500-1 and the second electronic devices. For example, the relaying device 400 may obtain the first and second registration information R1 and R2 from the first and second electronic devices 500-1 and 600-1, respectively, when the first and second electronic devices 500-1 and 600-1 are connected to the relaying device 400. Also, the relaying device 400 may obtain the first and second registration information R1 and R2 from the server 800, when the first and second electronic devices 500-1 and 600-1 are connected to the relaying device 400. For example, the relaying device 400 may register the first and second electronic devices 500-1 and 600-1 based on the first and second registration information R1 and R2.

An event occurs in the first electronic device 500-1, in step S1001. For example, the event may be an event of making or receiving a call.

The first electronic device 500-1 sends an event notification signal NS to the relaying device 400, in step S1003.

The relaying device 400 sends a request signal BS to the registered second electronic devices 600 in response to the event notification signal NS, in step S1005.

In some embodiments, the relaying device 400 may broadcast the request signal BS to all of the second electronic devices 600. The relaying device 400 may also send the request signal BS to at least one of the second electronic devices 600, e.g., the second electronic device 600-1.

The second electronic devices 600-1 confirms or approves the request to perform the event, in response to the request signal BS, in step S1007. For example, the second electronic device 600-1 may confirm or approve the request according to the user's choice or automatically by a program.

The second electronic device 600-1 to perform the event sends a response signal ACK to the relaying device 400, in step S1009.

The relaying device 400 sends a connection available signal AS to the first electronic device 500-1 in response to the response signal ACK, in operation S1011.

If the first and second electronic devices 500-1 and 600-1 are able to make a direct connection to each other, the relaying device 400 directly connects the first and second electronic devices 500-1 and 600-1.

For example, if the first and second electronic devices 500-1 and 600-1 have the same wireless communication scheme, the relaying device 400 connects the first and second electronic devices 500-1 and 600-1 directly.

Specifically, the relaying device 400 connects the first and second electronic devices 500-1 and 600-1 directly based on at least one of the first and second registration information R1 and R2, and the request signal ACK.

For example, the relaying device 400 may use an IP address of the first electronic device 500-1 included in the first registration information R1 and an IP address of the second electronic device 600-1 included in the second registration information R2 or the response signal ACK to connect the first and second electronic devices 500-1 and 600-1 directly. Furthermore, the relaying device 400 may use connection authorization information for the first electronic device 500-1 included in the first registration information R1 and connection authorization information for the second electronic device 600-1 included in the second registration information R2 or the request signal ACK to connect the first and second electronic devices 500-1 and 600-1 directly.

The first electronic device 500-1 sends the event information EI directly to the second electronic device 600-1 under the control of the relaying device 400 in order for the event to be performed in the second electronic device 600-1, in step 1013.

The second electronic device 600-1 performs the event using the event information EI under the control of the relaying device 400, in step S1015. For example, the user or the relaying device 400 may have the second electronic device 600-1 perform an event of making or receiving a call, which occurs in the first electronic device 500-1.

Figure 11:
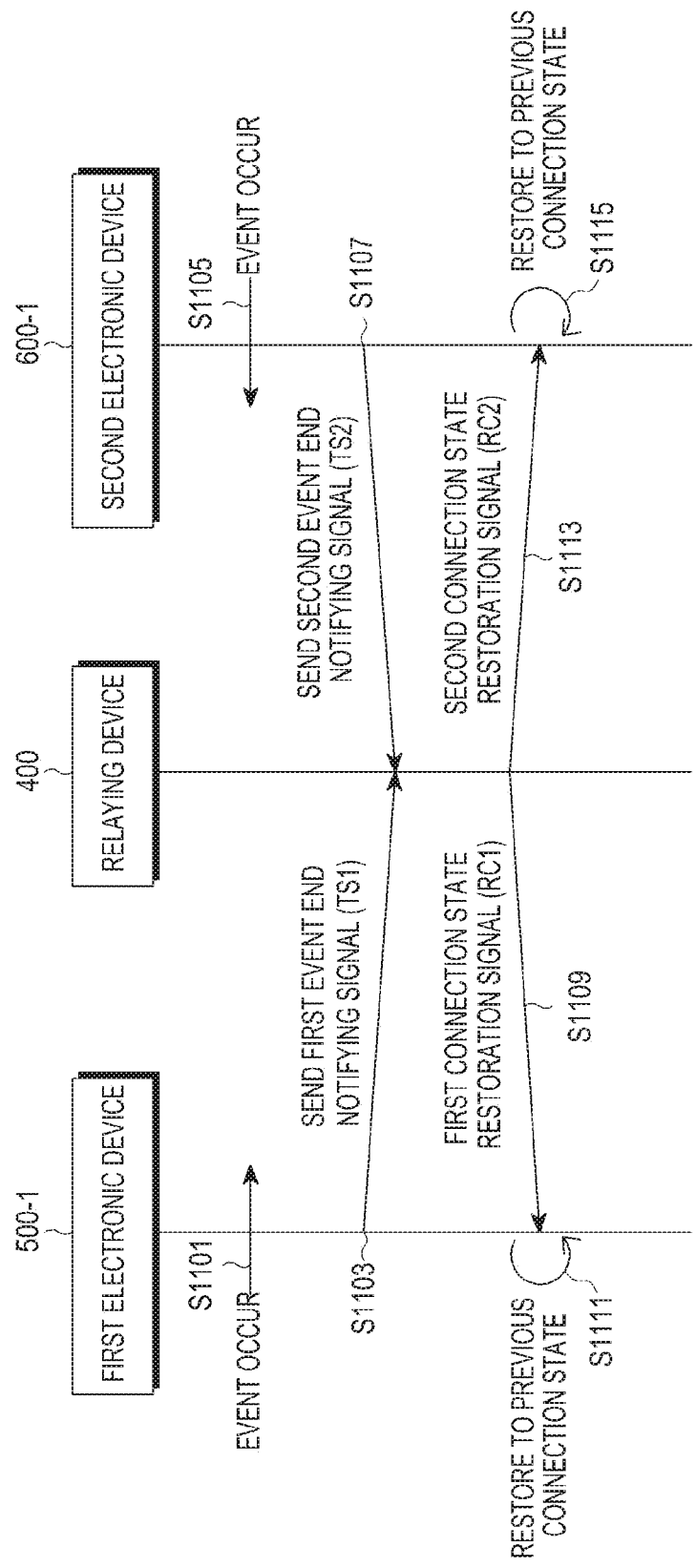
FIG. 11 is a data flow diagram of an operating method of a relaying device when an event is over, according to an embodiment of the present disclosure.

FIG. 11 is a data flow diagram of an operating method of a relaying device when an event is over, according to an embodiment of the present disclosure Referring to FIG. 11, the relaying device 400, the first electronic device 500-1, and the second electronic device 600-1 are provided. The relaying device 400 controls the second electronic device 600-1 to perform an event that occurs in the first electronic device 500-1, in step S1101. When the event is over in the first electronic device 500-1, the event is also over in the second electronic device 600-1.

In response to the end of the event, the first electronic device 500-1 sends a first event end notifying signal TS1 to the relaying device 400, in step S1103.

In response to the end of the event, the second electronic device 600-1 sends a second event end notifying signal TS2 to the relaying device 400, in step S1107.

The first event end notifying signal TS1 notifies that the event is over in the first electronic device 500-1, and the second event end notifying signal TS2 notifies that the event is over in the second electronic device 600-1.

When the event is over, the relaying device 400 restores the first and second electronic devices 500-1 and 600-1 to their previous states before they were connected.

The relaying device 400 sends a first connection state restoration signal RC1 to the first electronic device 500-1 in response to the first event end notifying signal TS1, in step S1109.

Furthermore, the relaying device 400 sends a second connection state restoration signal RC2 to the second electronic device 600-1 in response to the second event end notifying signal TS2, in step S1113.

The first connection state restoration signal RC1 is a signal to restore the first electronic device 500-1 to the previous state before connection, and the second connection state restoration signal RC2 is a signal to restore the second electronic device 600-1 to the previous state before connection.

The previous state before connection is the state of the first electronic device 500-1 and the second electronic device 600-1 before the first and second electronic devices 500-1 and 600-1 are connected.

For example, in the case when the first electronic device 500-1 was connected to a second electronic device 600-N(N is a natural number equal to or great than 2) prior to being connected to the second electronic device 600-1, when the event is over, the first electronic device 500-1 may be restored or changed to the state of being connected to the second electronic device 600-N under the control of the relaying device 400. Additionally, if the second electronic device 600-1 was not connected to another electronic device before being connected to the first electronic device 500-1, when the event is over, the second electronic device 600-1 may be restored or changed to a non-connected state.

The first electronic device 500-1 is restored to the previous connected state in response to the first connection state restoration signal RC1, in step S1111.

The second electronic device 600-1 is be restored to the previous connected state in response to the second connection state restoration signal RC2, in step S1115.

Figure 12:
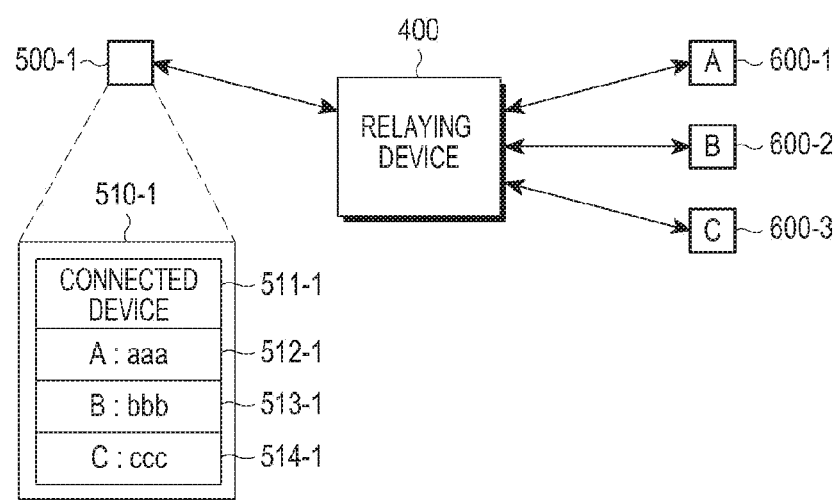
FIG. 12 is a block diagram of an interface of a first electronic device, according to an embodiment of the present disclosure.

FIG. 12 is a block diagram of an interface of a first electronic device, according to an embodiment of the present disclosure.

Referring to FIG. 12, the relaying device 400, the first electronic device 500-1, and the second electronic devices 600-1, 600-2, and 600-3 are provided. The first electronic device 500-1 includes a user interface 510-1.

With the user interface 510-1, the first electronic device 500-1 may select one of the second electronic devices 600, e.g., second electronic device 600-1, to perform an event. Furthermore, the first electronic device 500-1 may be connected to the second electronic device 600-1 through the user interface 510-1.

The user interface 510-1 includes information 512-1, 513-1, and 514-1 about the second electronic devices 600-1, 600-2, and 600-3 that are connected to the relaying device 400.

When the user selects a first information 512-1 of the user interface 510-1, the second electronic device 600-1, which corresponds to the first information 512-1, is selected. In other words, the first electronic device 500-1 may be connected to the second electronic device 600-1 based on as election of corresponding information in the user interface 510-1, under the control of the relaying device 400.

Also, when the user selects a second information 512-2 of the user interface 510-1, the second electronic device 600-2, which corresponds to the second information 512-2, is selected. In other words, the first electronic device 500-1 may be connected to the second electronic device 600-2 based on as election of corresponding information in the user interface 510-1, under the control of the relaying device 400.

Figure 13:
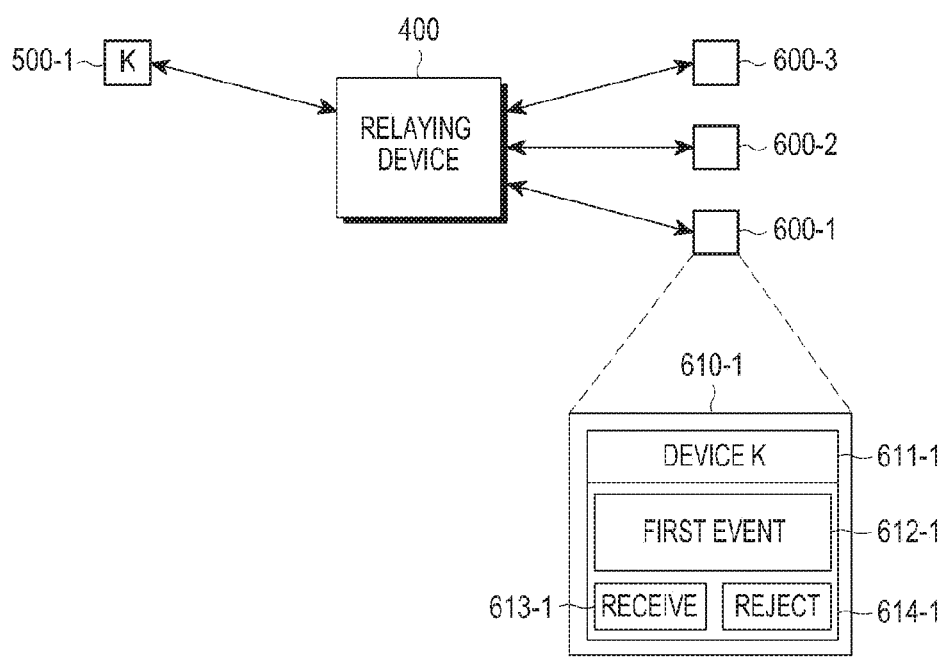
FIG. 13 is a block diagram of an interface of a second electronic device, according to an embodiment of the present disclosure.

FIG. 13 is a block diagram of an interface of a second electronic device, according to an embodiment of the present disclosure.

Referring to FIG. 13, the relaying device 400, the first electronic device 500-1, and the second electronic devices 600-1, 600-2, and 600-3 are provided. The second electronic device 600-1 includes a user interface 610-1.

The second electronic device 600-1 may perform an event that occurs in the first electronic device 500-1 using the user interface 610-1. Furthermore, the second electronic device 600-1 may be connected to the first electronic device 500-1 through the user interface 610-1.

The user interface 610-1 displays information about the first electronic device 500-1 and information about the events 611-1, 612-1, 613-1, and 614-1 that occur in the first electronic device 500-1, under the control of the relaying device 400.

The information illustrated about the events 611-1, 612-1, 613-1, and 614-1 is provided merely for convenience of explanation, and the information of an event is not limited thereto. For example, the information about an event may further include information indicating occurrence of the event, information requesting to perform the event, information indicating the end of the event, information indicating a state of progress of the event, and/or information about performing the event.

The user may check the information 611-1 about the first electronic device 500-1 and the information 612-1 about an event that occurs in the first electronic device 500-1, through the user interface 610-1. Furthermore, the user may determine whether to perform the event that occurs in the first electronic device 500-1 in the second electronic device 600-1, using the interface 610-1.

Specifically, the relaying device 400 may enable one of the second electronic devices 600-1 to 600-3, e.g., 600-1, for which the user provides confirmation or approval, to perform the event that occurs in the first electronic device 500-1.

For example, when the user selects "receive" 613-1 on the user interface 610-1, the second electronic device 600-1 performs the event that occurs in the first electronic device 500-1. If the user selects "reject" 614-1 on the user interface 610-1, the second electronic device 600-1 does not perform the event that occurs in the first electronic device 500-1.

Additionally, the second electronic devices 600-2 and 600-3 may use their respective user interfaces to perform an event that occurs in the first electronic device 500-1. Furthermore, the second electronic devices 600-2 and 600-3 may use their respective user interfaces to be connected to the first electronic device 500-1.

While, FIGS. 12 and 13 show three of the second electronic devices 600-1, 600-2, and 600-3 connected to the relaying device 400, the present disclosure is not limited thereto. The user interfaces 510-1 and 610-1 of the first and second electronic devices 500-1 and 600-1, respectively, are illustrated only by way of example for convenience of explanation, and the present disclosure is not limited thereto.

Figure 14:
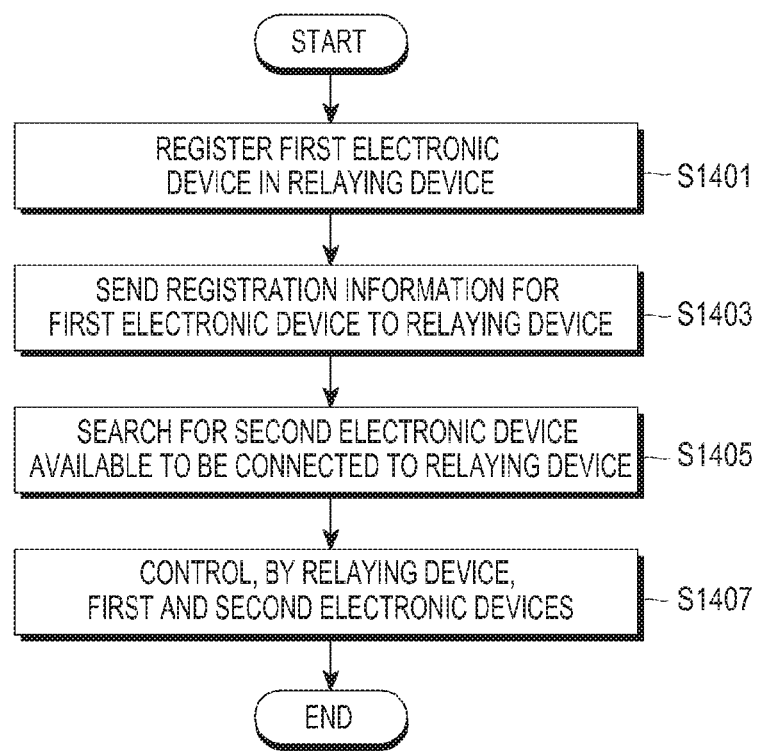
FIG. 14 is a flowchart of an operation of a relaying device registering first and second electronic devices, according to an embodiment of the present disclosure.

FIG. 14 is a flowchart of an operation of a relaying device registering first and second electronic devices, according to an embodiment of the present disclosure.

Referring to FIG. 14, the relaying device 400 registers the first electronic device 500-1, in step S1401. The first electronic device 500-1 may have installed an application that works with the relaying device 400, and use the application to be registered in the relaying device 400, in step S1401.

The first electronic device 500-1 sends the first registration information R1 to the relaying device 400, in step S1403. The relaying device 400 may use the first registration information R1 received from the first electronic device 500-1 to register the first electronic device 500-1. Furthermore, the relaying device 400 may receive information about the first electronic device 500-1 from the server 800 based on the first registration information R1.

The relaying device 400 may discover the second electronic devices 600 that are available to be connected to the relaying device 400, in step S1405. Moreover, the relaying device 400 may register the discovered second electronic devices 600.

The relaying device 400 receives the second registration information R2 from the discovered second electronic devices 600.

The relaying device 400 may use the second registration information R2 received from the second electronic devices 600 to register the second electronic devices 600.

The relaying device 400 controls the registered first electronic device 500-1 and second electronic devices 600, in step S1407.

For example, the relaying device 400 may use the first and second registration information R1 and R2 to control the first electronic device 500-1 and second electronic devices 600. The first electronic device 500-1 may be connected to the second electronic device 600-1 under the control of the relaying device 400.

Figure 15:
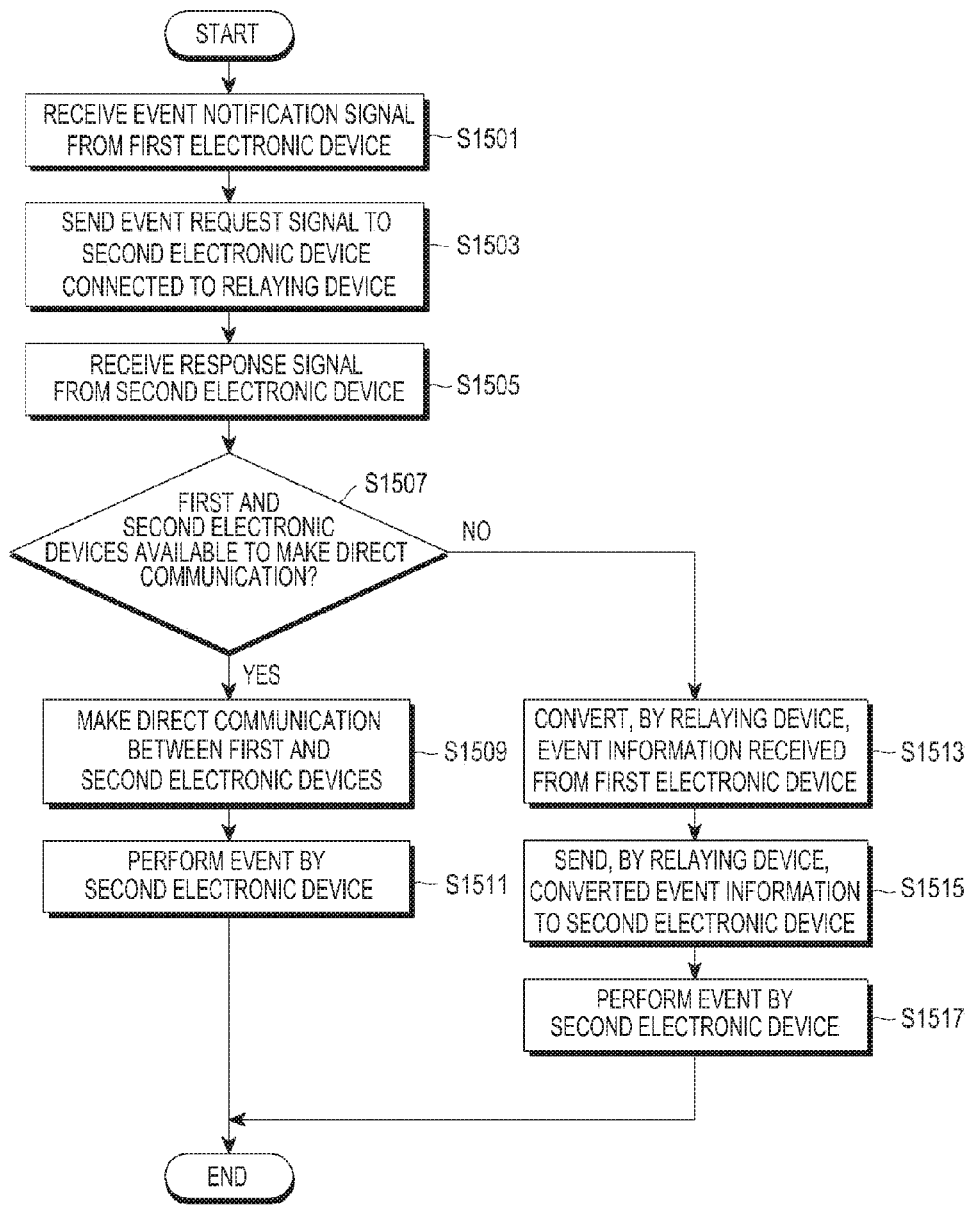
FIG. 15 is a flowchart of an operating method of a relaying device, according to an embodiment of the present disclosure.

FIG. 15 is a flowchart of an operating method of a relaying device, according to an embodiment of the present disclosure.

Referring to FIG. 15, the relaying device 400 may register the first electronic device 500-1 and the second electronic devices. For example, the relaying device 400 may obtain the first and second registration information R1 and R2 from the first and second electronic devices 500-1 and 600-1, respectively, when the first and second electronic devices 500-1 and 600-1 are connected to the relaying device 400. Also, the relaying device 400 may obtain the first and second registration information R1 and R2 from the server 800, when the first and second electronic devices 500-1 and 600-1 are connected to the relaying device 400. For example, the relaying device 400 may register the first and second electronic devices 500-1 and 600-1 based on the first and second registration information R1 and R2. When an event occurs in the first electronic device 500-1, the relaying device 400 receives the event notification signal NS from the first electronic device 500-1, in step S1501.

The relaying device 400 discovers the second electronic device 600-1 of the registered second electronic devices 600 to perform the event that occurs in the first electronic device 500-1.

The relaying device 400 sends or broadcasts a request signal BS to at least one of the registered second electronic devices 600, in response to the event notification signal NS, in step S1503.

The relaying device 400 receives the response signal ACK from the second electronic device 600-1 to perform the event, in step S1505.

The relaying device 400 determines whether the first and second electronic devices 500-1 and 600-1 are able to make a direct connection to each other, based on information about the first and second electronic devices 500-1 and 600-1, in step S1507.

For example, the relaying device 400 determines whether the first and second electronic devices 500-1 and 600-1 are able to make direct connection to each other based on at least one of the first and second registration information R1 and R2 and the request signal ACK. Furthermore, the relaying device 400 may determine whether the first and second electronic devices 500-1 and 600-1 are able to make a direct connection to each other, based on information about the first and second electronic devices 500-1 and 600-1 received from the server 800.

If the first and second electronic devices 500-1 and 600-1 are able to make a direct connection to each other in step S1507, the relaying device 400 connects the first and second electronic devices 500-1 and 600-1 directly, in step S1509.

The second electronic device 600-1 performs the event under the control of the relaying device 400, in step S1511.

If the first and second electronic devices 500-1 and 600-1 are unable to make a direct connection to each other in step S1507, the relaying device 400 relays the first and second electronic devices 500-1 and 600-1 to connect them.

For example, if the first and second electronic devices 500-1 and 600-1 have different wireless communication schemes, the relaying device 400 uses the first wireless communication scheme for the first electronic device 500-1 to convert or change the event information EI into the second wireless communication scheme of the second electronic device 600-1, in step S1513.

The relaying device 400 sends the event information EI' converted or changed into the second wireless communication scheme to the second electronic device 600-1, in step S1515.

The second electronic device 600-1 performs the event using the event information EI' under the control of the relaying device 400, in step S1517.

Figure 16:
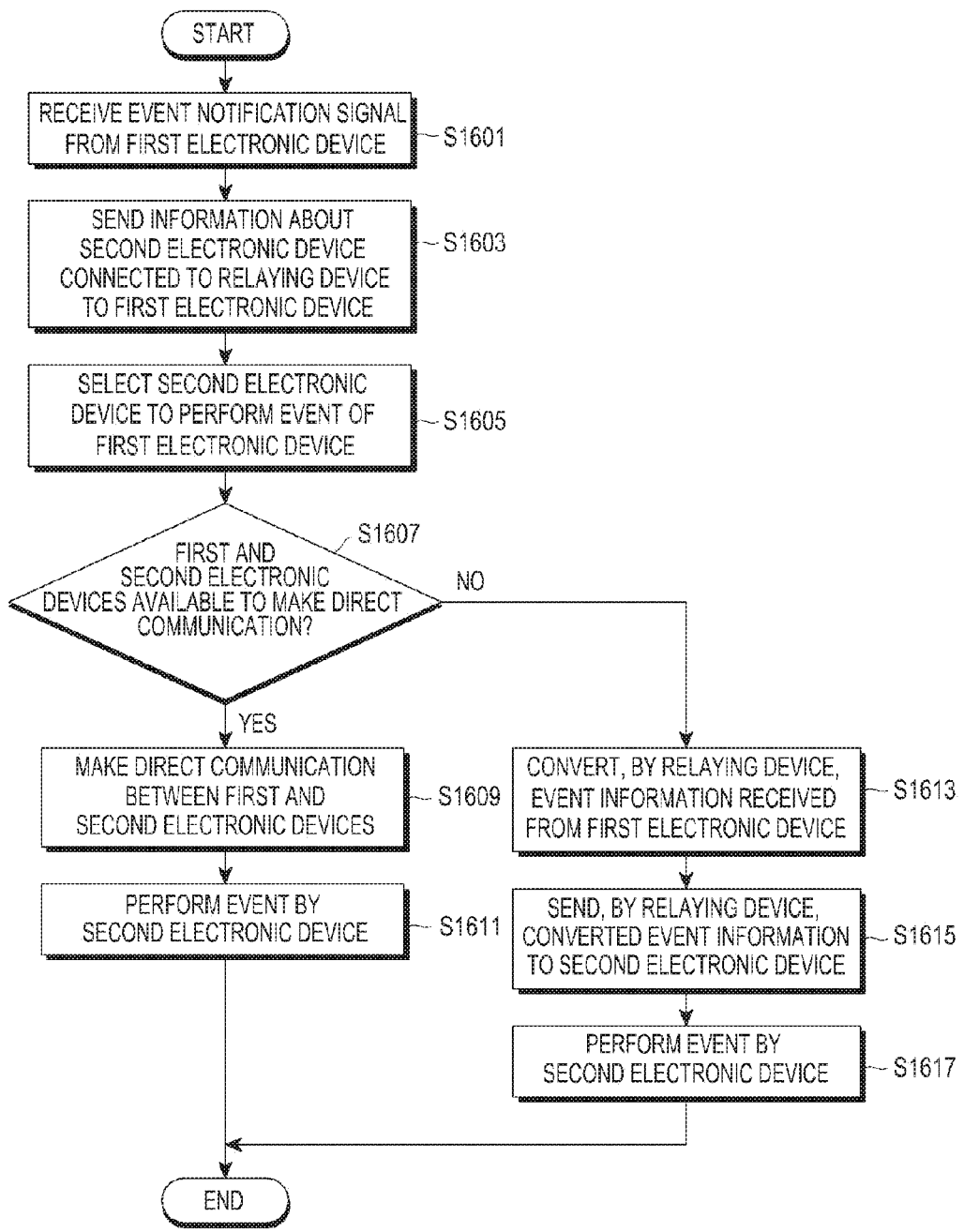
FIG. 16 is a flowchart of an operating method of a relaying device, according to an embodiment of the present disclosure.

FIG. 16 is a flowchart of an operating method of a relaying device, according to an embodiment of the present disclosure.

Referring to FIG. 16, the relaying device 400 may register the first electronic device 500-1 and the second electronic devices. For example, the relaying device 400 may obtain the first and second registration information R1 and R2 from the first and second electronic devices 500-1 and 600-1, respectively, when the first and second electronic devices 500-1 and 600-1 are connected to the relaying device 400. Also, the relaying device 400 may obtain the first and second registration information R1 and R2 from the server 800, when the first and second electronic devices 500-1 and 600-1 are connected to the relaying device 400. For example, the relaying device 400 may register the first and second electronic devices 500-1 and 600-1 based on the first and second registration information R1 and R2. When an event occurs in the first electronic device 500-1, the relaying device 400 receives the event notification signal NS from the first electronic device 500-1, in step S1601.

The relaying device 400 discovers the second electronic device 600-1 of the registered second electronic devices 600 to perform the event that occurs in the first electronic device 500-1.

The relaying device 400 sends information about at least one of the registered second electronic devices 600 to the first electronic device 500-1, in response to the event notification signal NS, in step S1503. For example, the relaying device 400 sends the second registration information R2 for at least one of the second electronic devices 600 to the first electronic device 500-1.

The first electronic device 500-1 selects the second electronic device 600-1 to perform the event, based on the second registration information R2, in step S1605. The relaying device 400 receives information about the selected second electronic device 600-1 from the first electronic device 500-1.

The relaying device 400 determines whether the first and second electronic devices 500-1 and 600-1 are able to make a direct connection to each other, based on information about the first and second electronic devices 500-1 and 600-1, in step S1607.

For example, the relaying device 400 determines whether the first and second electronic devices 500-1 and 600-1 are able to make a direct connection to each other based on at least one of the first and second registration information R1 and R2. Furthermore, the relaying device 400 may determine whether the first and second electronic devices 500-1 and 600-1 are able to make a direct connection to each other, based on information about the first and second electronic devices 500-1 and 600-1 received from the server 800.

If the first and second electronic devices 500-1 and 600-1 are able to make a direct connection to each other in step S1607, the relaying device 400 connects the first and second electronic devices 500-1 and 600-1 directly, in step S1609.

The second electronic device 600-1 performs the event under the control of the relaying device 400, in step S1611.

If the first and second electronic devices 500-1 and 600-1 are unable to make a direct connection to each other in step S1607, the relaying device 400 relays the first and second electronic devices 500-1 and 600-1 to connect them.

For example, if the first and second electronic devices 500-1 and 600-1 have different wireless communication schemes, the relaying device 400 uses the first wireless communication scheme for the first electronic device 500-1 to convert or change the event information EI into the second wireless communication scheme for the second electronic device 600-1, in step S1613.

The relaying device 400 sends the event information EI' converted or changed into the second wireless communication scheme to the second electronic device 600-1, in step S1615.

The second electronic device 600-1 performs the event using the event information EI' under the control of the relaying device 400, in step S1617.

Figure 17:
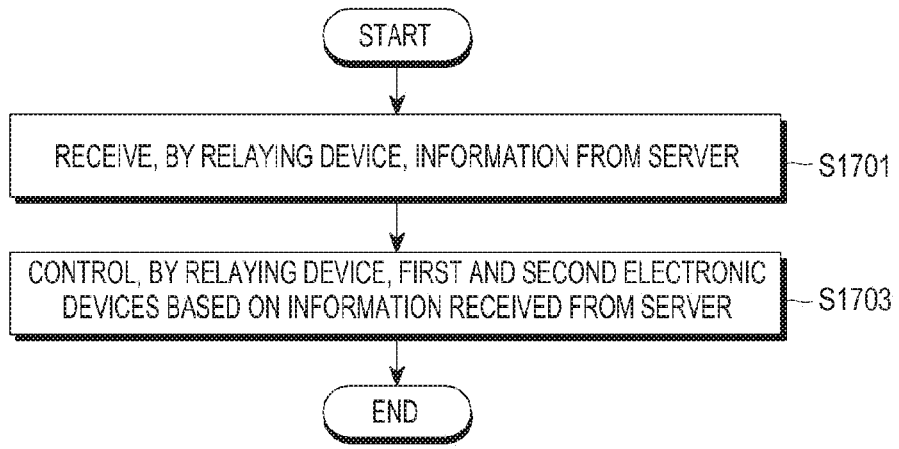
FIG. 17 is a flowchart of an operating method of a relaying device, according to an embodiment of the present disclosure.

FIG. 17 is a flowchart of an operating method of a relaying device, according to an embodiment of the present disclosure.

Referring to FIG. 17, the relaying device 400 receives information about the first and second electronic devices 500 and 600 from the server 800 over the network 700, in step S1701.

Specifically, if at least one of the first electronic devices 500 is registered in the relaying device 400, the relaying device 400 receives information about the first electronic devices 500 stored in the server 800. Furthermore, if at least one of the second electronic devices 600 is registered in the relaying device 400, the relaying device 400 receives information about the second electronic devices 600 stored in the server 800.

The relaying device 400 controls the first and second electronic devices 500 and 600 based on the information about the first and second electronic devices 500 and 600 received from the server 800.

In some embodiments, the relaying device 400 controls connections between the first and second electronic devices 500 and 600 based on the information about the first and second electronic devices 500 and 600 received from the server 800. Furthermore, the relaying device 400 controls the first electronic device 500-1 and second electronic device 600-1 for the event that occurs in the first electronic device 500-1 to be performed in the second electronic device 600-1, based on the information about the first and second electronic devices 500 and 600 received from the server 800.

The relaying device 400 may provide services for users of the first and second electronic devices 500-1 and 600-1 based on the information about the first and second electronic devices 500 and 600 received from the server 800. For example, in a case that the first electronic device 500-1 is a cell phone, the relaying device 400 may provide the user with an appropriate calling plan based on the information about the first electronic device 500-1.

Figure 18:
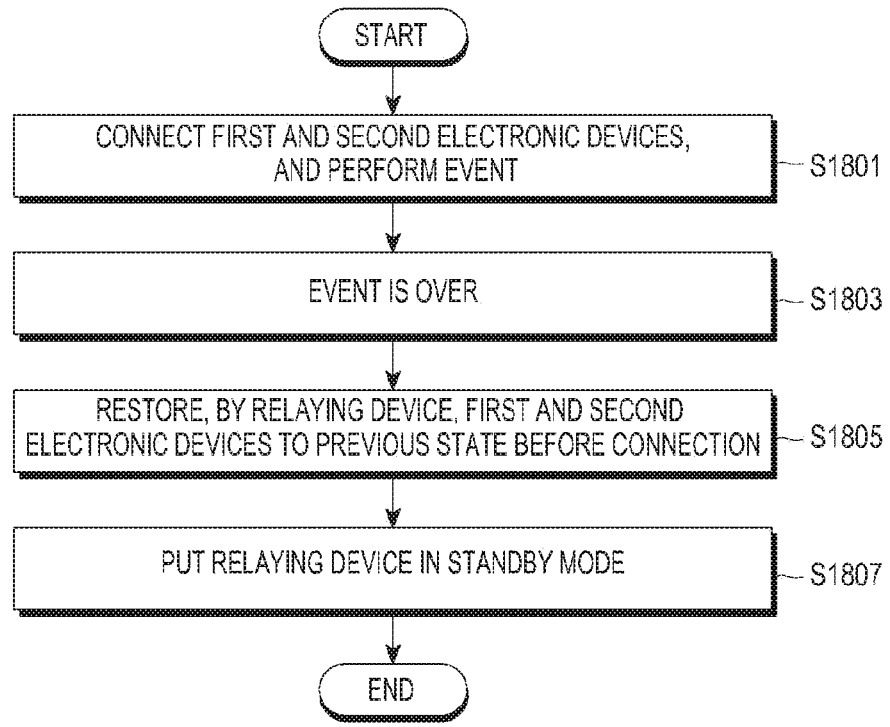
FIG. 18 is a flowchart of an operating method of a relaying device when an event is over, according to an embodiment of the present disclosure.

FIG. 18 is a flowchart of an operating method of a relaying device when an event is over, according to an embodiment of the present disclosure.

Referring to FIG. 18, the relaying device 400 connects the first and second electronic devices 500-1 and 600-1 and controls the second electronic device 600-1 to perform an event that occurs in the first electronic device 500-1, in step S1801.

When the event is over in the first electronic device 500-1, the event is also over in the second electronic device 600-1, in step S1803.

With the end of the event, the relaying device 400 restores each of the first and second electronic devices 500-1 and 600-1 to their previous states before they were connected, in step S1805.

The relaying device 400 maintains the first and second electronic devices 500-1 and 600-1 in a standby mode state, in step S1807.

The standby mode is a mode in which the surrounding electronic devices 500 and 600 are available to be connected to the relaying device 400. For example, it corresponds to a mode in which other electronic devices, not including the first and second electronic devices 500-1 and 600-1, are available to be connected to the relaying device 400. Furthermore, the standby mode may also correspond to a mode in which surrounding electronic devices 500 and 600, including the first and second electronic devices 500-1 and 600-1, are available to be connected to the relaying device 400.

In the standby mode, the relaying device 400 may remain in a low power-driven state.

Figure 19:
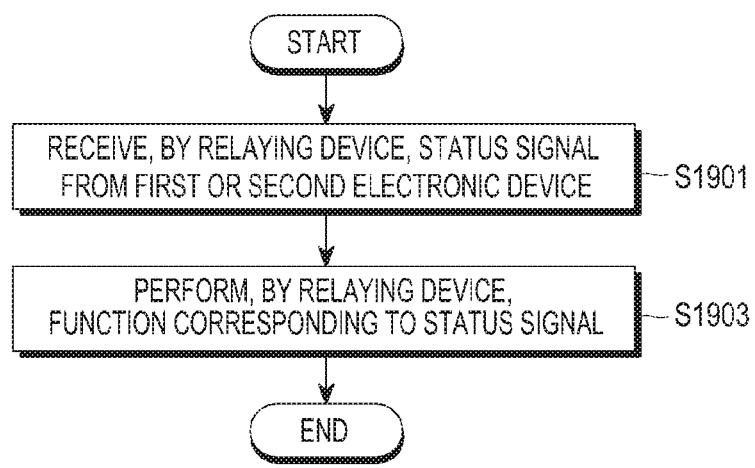
FIG. 19 is a flowchart of an operating method of a relaying device, according to an embodiment of the present disclosure.

FIG. 19 is a flowchart of an operating method of a relaying device, according to an embodiment of the present disclosure.

Referring to FIG. 19, the relaying device 400 receives status signals from the registered first and second electronic devices 500 and 600. The status signals are signals including information about a special state set in each of the first and second electronic devices 500 and 600.

The relaying device 400 controls the first and second electronic devices 500 and 600 based on the status signals. For example, if the status signal indicates that the second electronic device 600-1 is in a state of being charged, the relaying device 400 controls the second electronic device 600-1 to not perform the event that occurs in the first electronic device 500-1.

Figure 20:
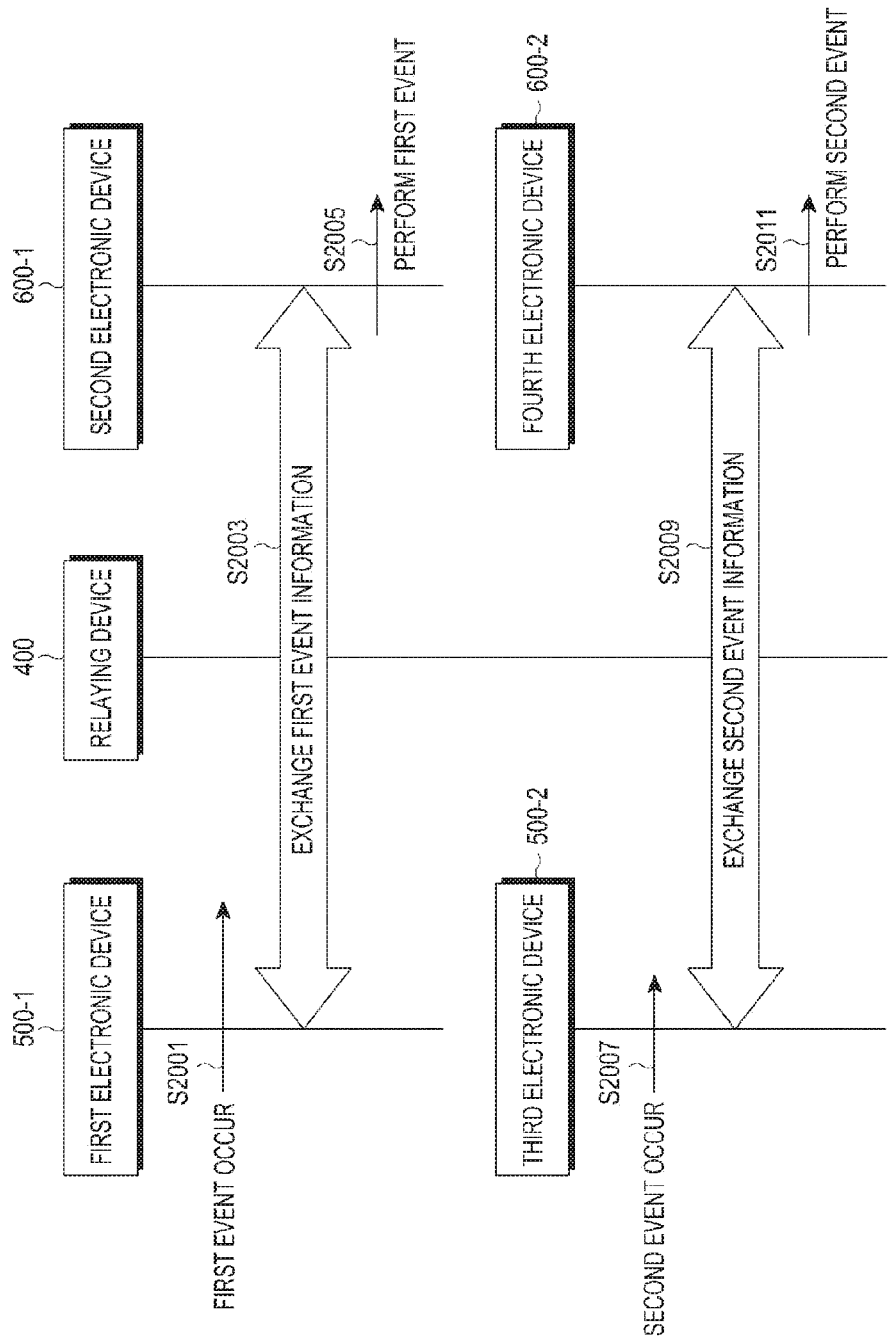
FIG. 20 is a data flow diagram of an operating method of a relaying device, according to an embodiment of the present disclosure.

FIG. 20 is a data flow diagram of an operating method of a relaying device, according to an embodiment of the present disclosure.

Referring to FIG. 20, the relaying device 400, the first electronic device 500-1, the second electronic device 600-1, a third electronic device 500-2, and a fourth electronic device 600-2 are provided. The relaying device 400 controls the second electronic device 600-1 to perform or execute a first event that occurs in the first electronic device 500-1.

When the first event occurs in the first electronic device 500-1 in step S2001, the relaying device 400 connects the first and second electronic devices 500-1 and 600-1. The relaying device 400 controls the first electronic device 500-1 and the second electronic device 600-1 such that first event information about the first event is sent to the second electronic device 600-1, in step S2003.

The second electronic device 600-1 performs the first event under the control of the relaying device 400, in step S2005.

While the first and second electronic devices 500-1 and 600-1 are connected, the relaying device 400 may allow the fourth electronic device 600-2 to perform or execute a second event that occurs in the third electronic device 500-2.

When the second event occurs in the third electronic device 500-2 in step S2007, the relaying device 400 connects the third and fourth electronic devices 500-2 and 600-2, in step S2007. The relaying device 400 controls the third electronic device 500-2 and the fourth electronic device 600-2 such that second event information about the second event is sent to the fourth electronic device 600-2, in step S2009.

The fourth electronic device 600-2 performs the second event under the control of the relaying device 400, in step S2011.

Operation of the relaying device 400 to connect the third and fourth electronic devices 500-2 and 600-2 and controlling the fourth electronic device 600-2 to perform the second event that occurs in the third electronic device 500-2 may be implemented to be substantially the same as operation for the first and second electronic devices 500-1 and 600-1.

While the first and second electronic devices 500-1 and 600-1 are connected, the relaying device 400 may connect the third and fourth electronic devices 500-2 and 600-2. That is, the relaying device 400 may connect multiple electronic devices at the same time.

Figure 21:
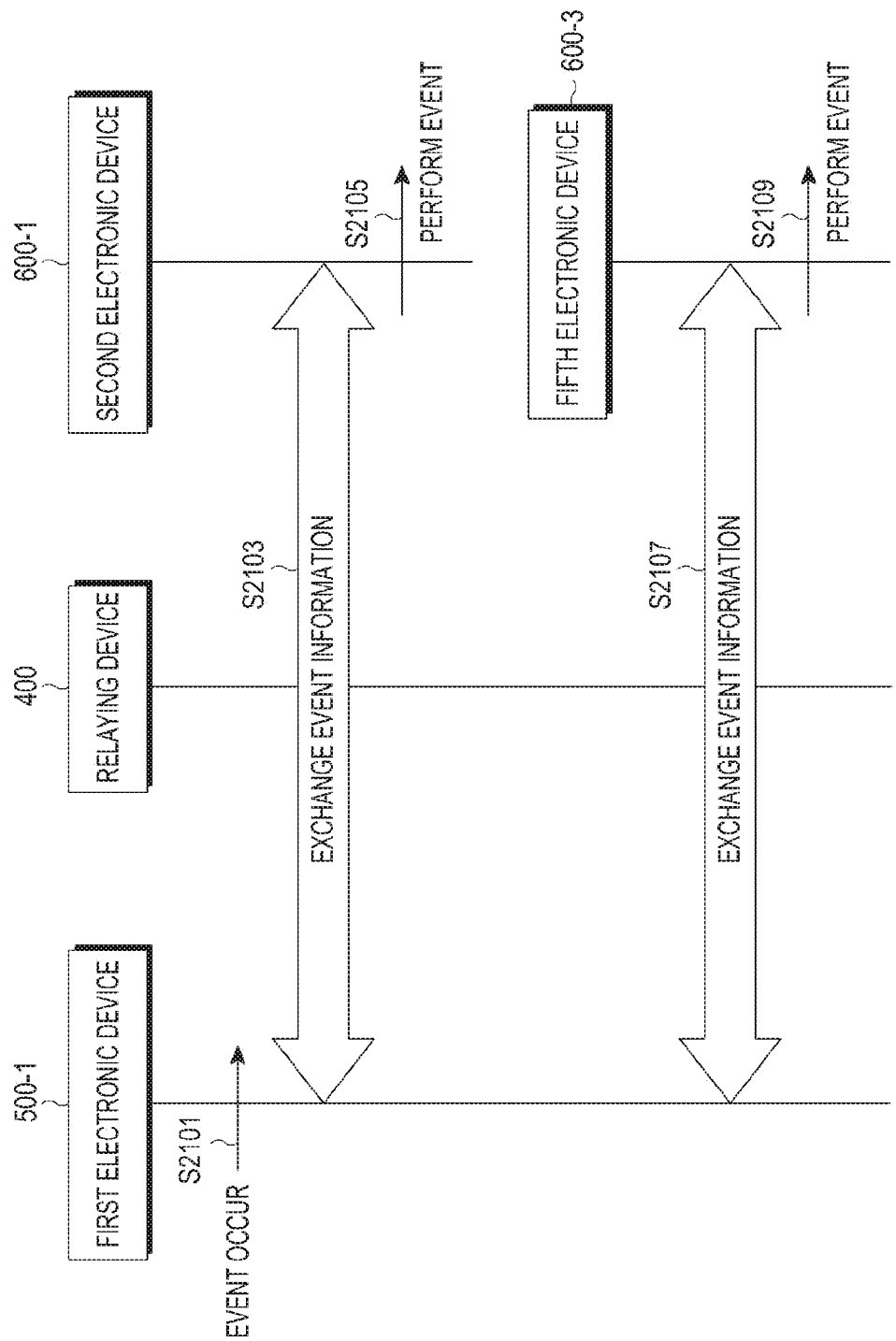
FIG. 21 is a data flow diagram of an operating method of a relaying device, according to an embodiment of the present disclosure.

FIG. 21 is a data flow diagram of an operating method of a relaying device, according to an embodiment of the present disclosure.

Referring to FIG. 21, the relaying device 400, the first electronic device 500-1, the second electronic device 600-1, and a fifth electronic device 600-3 are provided. The relaying device 400 controls the second electronic device 600-1 to perform or execute an event that occurs in the first electronic device 500-1.

When an event occurs in the first electronic device 500-1 in step S2101, the relaying device 400 connects the first and second electronic devices 500-1 and 600-1. The relaying device 400 controls the first electronic device 500-1 and the second electronic device 600-1 such that event information EI or EI' about the event is sent to the second electronic device 600-1, in step S2103.

The second electronic device 600-1 performs the event under the control of the relaying device 400, in step S2105.

While the first and second electronic devices 500-1 and 600-1 are connected, the relaying device 400 controls the fifth electronic device 600-3 to perform or execute the event that occurs in the first electronic device 500-1. That is, when the event occurs in the first electronic device 500-1, the relaying device 400 connects the first electronic devices 500-1 to the fifth electronic device 600-3 to perform the event with the second electronic device 600-1, in step S2107. The relaying device 400 controls the fifth electronic device 600-3 such that event information EI or EI' about the event may be sent to the fifth electronic device 600-3, in step S2107.

The fifth electronic device 600-3 performs the event under the control of the relaying device 400, in step S2109.

Operation of the relaying device 400 to connect the first and fifth electronic devices 500-1 and 600-3 and controlling the fifth electronic device 600-3 to perform the event that occurs in the first electronic device 500-1 may be implemented to be substantially the same as operation for the first and second electronic devices 500-1 and 600-1.

While the first and second electronic devices 500-1 and 600-1 are connected, the relaying device 400 may connect the first and fifth electronic devices 500-1 and 600-3. That is, the relaying device 400 may connect multiple electronic devices at the same time.

Each of the aforementioned components of the electronic device of the present disclosure may include one or more parts, and a name of the part may vary with a type of the electronic device. The electronic device may include at least one of the aforementioned components, omit some of them, or include other additional components. Some of the components may be combined into a single entity, however the entity may perform the same functions as the individual components do.

Embodiments as described in the specification are provided for the purpose of describing and understanding of technical concept of the present disclosure. Accordingly, the scope of the present disclosure should be construed as including all the modifications or other various embodiments based on the technical idea of the present disclosure. Therefore, the scope of the present disclosure is defined, not by the detailed description and embodiments, but by the following claims and their equivalents.

What is claimed is:

1. A method of operating a relaying device, the method comprising:
   detecting a first event generated in a first electronic device registered in the relaying device;
   discovering a second electronic device registered in the relaying device, to perform a function corresponding to the first event on the second electronic device;
   controlling the first electronic device to transmit, directly to the second electronic device, information related to the first event, when the first electronic device and the second electronic device use a same communication scheme;
   controlling the first electronic device to transmit, to the second electronic device, via the relaying device, the information related to the first event, when the first electronic device and the second electronic device use different communication schemes; and controlling the second electronic device to perform the function corresponding to the first event using the information related to the first event.

2. The method of claim 1, wherein controlling the first electronic device to transmit, to the second electronic device, via the relaying device, the information related to the first event comprises:
relaying the first electronic device and the second electronic device to connect the first electronic device and the second electronic device to each other via the relaying device, when the first electronic device and the second electronic device are unable to make a direct connection to each other.

3. The method of claim 2, wherein controlling the first electronic device to transmit, to the second electronic device, via the relaying device, the information related to the first event further comprises:
transmitting the information related to the first event, which is received from the first electronic device through a first wireless communication, to the second electronic device through a second wireless communication.

4. The method of claim 1, wherein controlling the first electronic device to transmit, directly to the second electronic device, the information related to the first event comprises:
controlling the first and second electronic devices to be connected directly, when the first electronic device and the second electronic device are able to make a direct connection to each other.

5. The method of claim 1, further comprising determining whether to connect directly or relay the first electronic device and the second electronic device based on registration information of the first electronic device and the second electronic device.

6. The method of claim 1, further comprising:
restoring the first electronic device and the second electronic device to a previous state, when the first event is over.

7. The method of claim 1, further comprising:
detecting a second event generated in a third electronic device registered in the relaying device, while the first electronic device and the second electronic device are connected or relayed;
discovering a fourth electronic device registered in the relaying device, to perform a function corresponding to the second event on the fourth electronic device;
controlling the third electronic device to transmit, directly to the fourth electronic device, information related to the second event, when the third electronic device and the fourth electronic device use a same communication scheme;
controlling the third electronic device to transmit, to the fourth electronic device, via the relaying device, the information related to the second event, when the third electronic device and the fourth electronic device use different communication schemes; and
controlling the fourth electronic device to perform the function corresponding to the second event while the second electronic device performs the function corresponding to the first event.

8. The method of claim 1, further comprising:
discovering a fifth electronic device registered in the relaying device, to perform the function corresponding to the first event on the fifth electronic device with the second electronic device;
controlling the first electronic device to transmit, directly to the fifth electronic device, the information related to the first event, when the first electronic device and the fifth electronic device use a same communication scheme;
controlling the first electronic device to transmit, to the fifth electronic device, via the relaying device, the information related to the first event, when the first electronic device and the fifth electronic device use different communication schemes; and
controlling the fifth electronic device to perform the function corresponding to the first event with the second electronic device.

9. The method of claim 1, further comprising obtaining information of at least one electronic device in order to control the at least one electronic device when the at least one electronic device is registered in the relaying device.

10. A relaying device comprising:
a communication module; and
a processor configured to:
detect a first event generated in a first electronic device registered in the relaying device;
discover a second electronic device registered in the relaying device, to perform a function corresponding to the first event on the second electronic device,
control the first electronic device to transmit, directly to the second electronic device, information related to the first event, when the first electronic device and the second electronic device use a same communication scheme,
control the first electronic device to transmit, to the second electronic device, via the relaying device, the information related to the first event, when the first electronic device and the second electronic device use different communication schemes, and
control the second electronic device to perform the function corresponding to the first event using the information related to the first event.

11. The relaying device of claim 10, wherein the processor is further configured to determine whether to connect directly or relay the first electronic device and the second electronic device based on registration information of the first electronic device and the second electronic device.

12. The relaying device of claim 10, wherein the processor is further configured to control the first communication module and the second communication module to relay between the first electronic device and the second electronic device via the relaying device, when the first electronic device and the second electronic device are unable to make a direct connection to each other.

13. The relaying device of claim 12, wherein the processor is further configured to transmit the information related to the first event, which is received from the first electronic device through a first wireless communication, to the second electronic device through a second wireless communication.

14. The relaying device of claim 10, wherein the processor is further configured to:
detect a second event generated in a third electronic device registered in the relaying device, while the first electronic device and the second electronic device are connected or relayed,
discover a fourth electronic device registered in the relaying device, to perform a function corresponding to the second event on the fourth electronic device,
control the third electronic device to transmit, directly to the fourth electronic device, information related to the second event, when the third electronic device and the fourth electronic device use a same communication scheme, control the third electronic device to transmit, to the fourth electronic device, via the relaying device, the information related to the second event, when the third electronic device and the fourth electronic device use different communication schemes, and control the fourth electronic device to perform the function corresponding to the second event while the second electronic device performs the function corresponding to the first event.

15. The relaying device of claim 10, wherein the processor is further configured to:

discover a fifth electronic device registered in the relaying device, to perform the function corresponding to the first event on the fifth electronic device with the second electronic device, control the first electronic device to transmit, directly to the fifth electronic device, the information related to the first event, when the first electronic device and the fifth electronic device use a same communication scheme, control the first electronic device to transmit the information related to first event to the fifth electronic device, when the first electronic device and the fifth electronic device use different communication schemes, and control the fifth electronic device to perform the function corresponding to the first event with the second electronic device.

16. The relaying device of claim 10, wherein the processor is further configured to restore the first electronic device and the second electronic device to a previous state, when the first event is over.

17. The relaying device of claim 10, wherein the processor obtains information of at least one electronic device in order to control the at least one electronic device when the at least one electronic device is registered in the relaying device.

* * * * *